(12) United States Patent
Komaru et al.

(10) Patent No.: US 10,782,265 B2
(45) Date of Patent: Sep. 22, 2020

(54) ANALYSIS APPARATUS

(71) Applicant: SHARP KABUSHIKI KAISHA, Sakai, Osaka (JP)

(72) Inventors: Shohei Komaru, Sakai (JP); Fumiaki Sugimori, Sakai (JP); Tadashi Iwamatsu, Sakai (JP); Chika Hirakawa, Sakai (JP); Mai Takasaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/362,271

(22) Filed: Mar. 22, 2019

(65) Prior Publication Data
US 2019/0302055 A1 Oct. 3, 2019

(30) Foreign Application Priority Data

Mar. 30, 2018 (JP) .................................. 2018-067547
Nov. 13, 2018 (JP) .................................. 2018-213040

(51) Int. Cl.
*G01N 27/70* (2006.01)
*G01N 27/64* (2006.01)
*G01N 27/62* (2006.01)

(52) U.S. Cl.
CPC .......... *G01N 27/622* (2013.01); *G01N 27/64* (2013.01); *G01N 27/70* (2013.01)

(58) Field of Classification Search
CPC ....... G01N 27/622; G01N 27/68; H01J 49/40; H01J 49/08; H01J 49/10; H01J 49/147
USPC ... 250/287, 288, 286, 281, 292, 293, 396 R, 250/423 R
See application file for complete search history.

(56) References Cited

U.S. PATENT DOCUMENTS

| | | | | |
|---|---|---|---|---|
| 5,969,349 A * | 10/1999 | Budovich | ............ | G01N 27/622 250/286 |
| 6,291,821 B1 * | 9/2001 | Danylewych-May | ....................... | G01N 25/56 250/286 |
| 6,495,823 B1 * | 12/2002 | Miller | .................. | G01N 27/624 250/286 |
| 6,784,424 B1 * | 8/2004 | Willoughby | ........ | H01J 49/4215 250/292 |
| 6,806,463 B2 * | 10/2004 | Miller | .................... | B01D 59/44 250/281 |
| 6,815,669 B1 * | 11/2004 | Miller | ................. | H01J 49/0018 250/286 |
| 7,312,444 B1 * | 12/2007 | Willougbhy | .......... | H01J 49/065 250/288 |

(Continued)

FOREIGN PATENT DOCUMENTS

JP 2011-077054 A 4/2011

*Primary Examiner* — David A Vanore
(74) *Attorney, Agent, or Firm* — ScienBiziP, P.C.

(57) ABSTRACT

An analysis apparatus includes an ionization section, an ion separation section, and an ion detection section. The ionization section generates one or more sample component-derived ions. The ion separation section separates the ions in accordance with mobility of the ions. The ion detection section detects the ion which passes through the ion separation section. The ionization section includes a reaction chamber and an electron emission element. A sample is introduced to the reaction chamber. The electron emission element emits an electron to the reaction chamber.

15 Claims, 10 Drawing Sheets

(56) References Cited

U.S. PATENT DOCUMENTS

| | | | |
|---|---|---|---|
| 7,470,898 B2* | 12/2008 | Merrick | H01J 49/0031 |
| | | | 250/282 |
| 7,518,108 B2* | 4/2009 | Frey | H01J 49/0045 |
| | | | 250/281 |
| 9,683,963 B2* | 6/2017 | Verenchikov | G01N 27/622 |
| 2003/0209665 A1* | 11/2003 | Losch | G01N 27/622 |
| | | | 250/287 |
| 2004/0094704 A1* | 5/2004 | Miller | G01N 27/624 |
| | | | 250/287 |
| 2005/0139762 A1* | 6/2005 | Miller | G01N 27/624 |
| | | | 250/282 |
| 2005/0173629 A1* | 8/2005 | Miller | G01N 27/624 |
| | | | 250/290 |
| 2005/0230616 A1* | 10/2005 | Cameron | G01N 27/624 |
| | | | 250/287 |
| 2007/0023637 A1* | 2/2007 | Ulrich | G01N 27/622 |
| | | | 250/287 |
| 2007/0176092 A1* | 8/2007 | Miller | G01N 27/624 |
| | | | 250/288 |
| 2008/0128609 A1 | 6/2008 | Miller et al. | |
| 2009/0095917 A1* | 4/2009 | Doring | H01J 49/145 |
| | | | 250/424 |
| 2009/0189064 A1* | 7/2009 | Miller | G01N 27/624 |
| | | | 250/282 |
| 2009/0200459 A1* | 8/2009 | Zimmer | H01J 49/08 |
| | | | 250/282 |
| 2011/0036977 A1* | 2/2011 | Denton | G01N 27/622 |
| | | | 250/283 |
| 2011/0172931 A1* | 7/2011 | Murthy | G16C 20/20 |
| | | | 702/32 |
| 2012/0228490 A1* | 9/2012 | Wu | G01N 27/622 |
| | | | 250/282 |
| 2013/0153762 A1* | 6/2013 | Munchmeyer | G01N 27/64 |
| | | | 250/282 |
| 2015/0001387 A1* | 1/2015 | Boumsellek | G01N 27/68 |
| | | | 250/282 |
| 2015/0069254 A1* | 3/2015 | Fernandez | G01N 27/622 |
| | | | 250/389 |
| 2015/0233866 A1* | 8/2015 | Verenchikov | G01N 27/622 |
| | | | 250/282 |
| 2016/0054264 A1* | 2/2016 | Carver | H01J 49/0031 |
| | | | 250/282 |
| 2016/0305909 A1* | 10/2016 | Zimmermann | G01N 27/622 |
| 2016/0370321 A1* | 12/2016 | Walte | G01N 27/622 |
| 2018/0172635 A1* | 6/2018 | Lai | H01J 49/0009 |

* cited by examiner

| HUMIDITY X [%RH] | Vd [V] | QUANTITY OF ELECTRONS I [A] | |
|---|---|---|---|
| 1.2 | 18 | 7.23E-08 | ← Ia |
| 5.3 | 18 | 4.19E-07 | ← Ib |
| 9.6 | 18 | 1.80E-06 | ← Ic |
| 19.9 | 18 | 4.12E-06 | ← Id |

ANALYSIS APPARATUS

BACKGROUND

1. Field

The present disclosure relates to an analysis apparatus.

2. Description of the Related Art

A detection system of Japanese Unexamined Patent Application Publication No. 2011-77054 includes an ionization source, an ion filter, and an electronic controller. The ionization source ionizes a sample. The ionization source is disposed upstream of the ion filter. The electronic controller controls a path of the ions which pass through the ion filter. The ionization source includes corona discharging, ultraviolet ray emitting method, or radioactive source.

However, in a case where the radioactive source is used as the ionization source, some notice and management particular to a radioactive material are desired. Accordingly, a complicated work is desired in order to ionize the sample.

It is desirable to provide an analysis apparatus which is capable of easily ionizing the sample.

SUMMARY

According to an aspect of the disclosure, there is provided an analysis apparatus that includes an ionization section, an ion separation section, and an ion detection section. The ionization section generates one or more sample component-derived ions. The ion separation section separates the ions in accordance with mobility of the ions. The ion detection section detects the ion which passes through the ion separation section. The ionization section includes a reaction chamber and an electron emission element. A sample is introduced to the reaction chamber. The electron emission element emits an electron to the reaction chamber.

DESCRIPTION OF THE EMBODIMENTS

Figure 1:
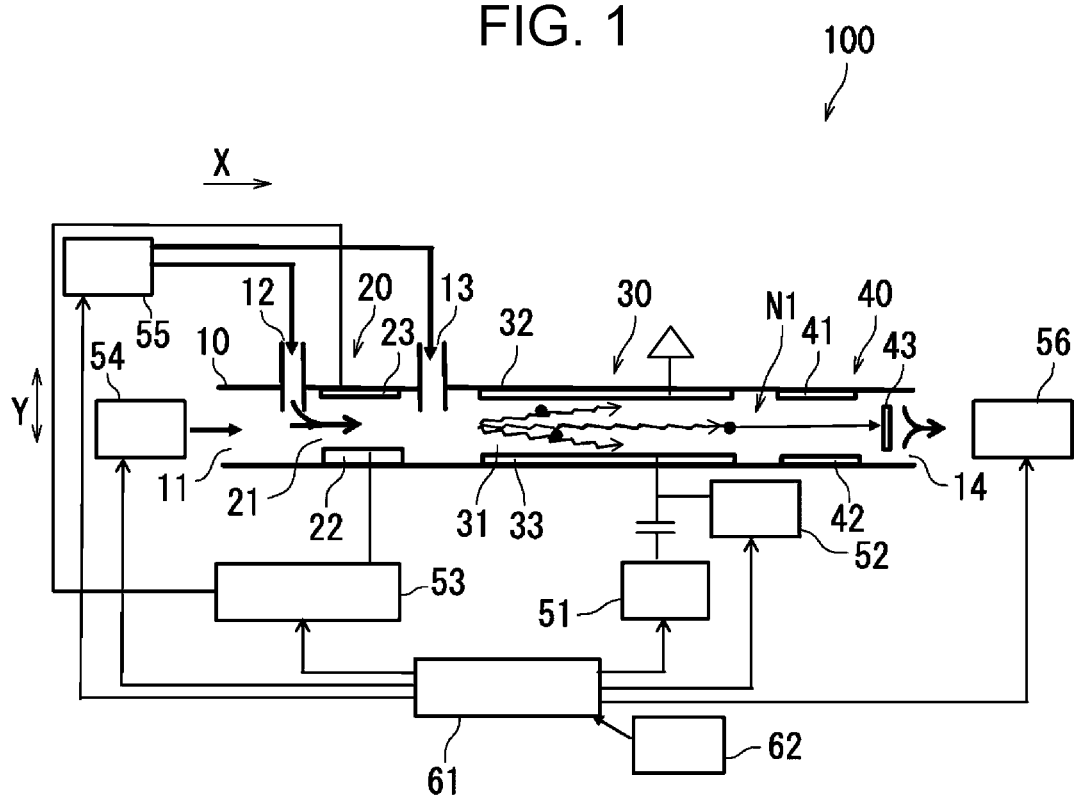
FIG. 1 is a schematic diagram illustrating a first embodiment of an analysis apparatus.

An analysis apparatus 100, which is an embodiment of the disclosure, will be described with reference to the accompanying drawings. Meanwhile, the same reference symbols are attached to the same or equivalent parts in the drawings, and the description thereof will not be repeated.

First Embodiment

Figure 2:
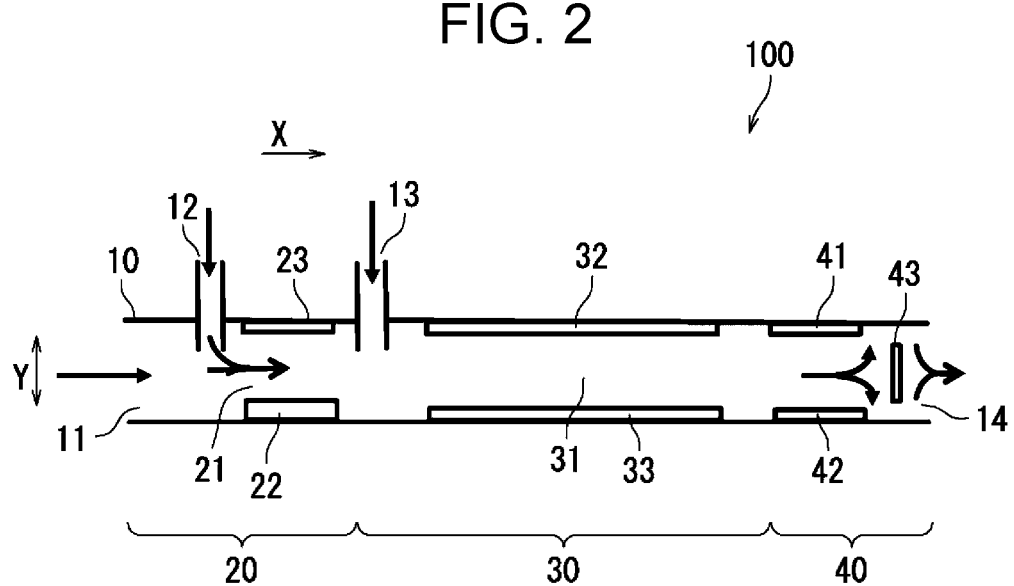
FIG. 2 is a partially enlarged diagram illustrating the first embodiment of the analysis apparatus.

A first embodiment of the analysis apparatus 100 will be described with reference to FIGS. 1 and 2. FIG. 1 is a schematic diagram illustrating the first embodiment of the analysis apparatus 100. FIG. 2 is a partially enlarged diagram illustrating the analysis apparatus 100.

As illustrated in FIGS. 1 and 2, the analysis apparatus 100 is an ion mobility spectrometry (IMS) apparatus which ionizes a sample and detects the ionized sample.

The analysis apparatus 100 of the first embodiment is a field asymmetric ion mobility spectrometry (FAIMS) apparatus. Hereinafter, there is a case where the field asymmetric ion mobility spectrometry apparatus is described as FAIMS.

The sample may be a molecule which is capable of being ionized in a gaseous phase. The sample indicates, for example, a compound having a positive electron affinity, a chemical agent, a narcotic, a stimulant, an organic compound (for example, an organic solvent which is covered by Ordinance on Prevention of Organic Solvent Poisoning), pesticide, or an environmental material. The chemical agent indicates, for example, a chemical warfare agent, such as a nerve gas, a blister agent, an asphyxiant, a blood agent, a sternutator, or a lachrymator, or a compound which is similar to the chemical warfare agent.

The analysis apparatus 100 includes a guide section 10, a sample inlet section 11, a first carrier gas inlet section 12, a second carrier gas inlet section 13, a sample introduction section 54, and a carrier gas introduction section 55.

The guide section 10 is formed in a tubular shape. An inside of the guide section 10 is formed with an ion movement path which extends along a movement direction X. Ions indicate sample-derived ions which are generated by ionizing a sample. The movement direction X is a movement direction of the ions which move toward an ion detection section 40 from the reaction chamber 21. Meanwhile, the reaction chamber 21 and the ion detection section 40 will be described later. The shape of the guide section 10 is not limited to the tube shape. It is sufficient that the guide section 10 has a hollow shape. The guide section 10 is an example of a casing of the disclosure.

Each of the sample inlet section 11, the first carrier gas inlet section 12, and the second carrier gas inlet section 13 is an opening section which leads to the inside of the guide section 10. The sample inlet section 11 is formed the uppermost stream of the guide section 10 in the movement direction X. Each of the first carrier gas inlet section 12 and the second carrier gas inlet section 13 is formed in a middle part of the guide section 10 in the movement direction X.

The first carrier gas inlet section 12 is located upstream rather than the second carrier gas inlet section 13 in the movement direction X.

The sample introduction section 54 is connected to the sample inlet section 11, and introduces the sample to the inside of the guide section 10 via the sample inlet section 11. A gaseous sample or a sample, which is vaporized due to heating, is introduced to the sample introduction section 54.

The carrier gas introduction section 55 is connected to each of the first carrier gas inlet section 12 and the second carrier gas inlet section 13, and introduces a carrier gas to the inside of the guide section 10 via each of the first carrier gas inlet section 12 and the second carrier gas inlet section 13. The carrier gas moves in the inside of the guide section 10 toward the downstream of the movement direction X.

The carrier gas indicates a gas which does not include the sample. The carrier gas is, for example, dry air which is drier than atmospheres. In this case, for example, a filter which has a drying function is provided for each of the first carrier gas inlet section 12 and the second carrier gas inlet section 13. Furthermore, in a case where outside air of the guide section 10 passes through the filter, the dry air is generated. As a result, the carrier gas which is the dry air is introduced to the inside of the guide section 10 via each of the first carrier gas inlet section 12 and the second carrier gas inlet section 13. The filter which has the drying function indicates, for example, a filter which has a drying agent such as a molecular sieve. Meanwhile, the filter may further have a cleaning function in addition to the drying function. In this case, clean dry air, in which impurities are reduced and which is drier than the atmospheres, is introduced to the inside of the guide section 10.

Meanwhile, only at least one of the first carrier gas inlet section 12 and the second carrier gas inlet section 13 may exist.

In addition, both the first carrier gas inlet section 12 and the second carrier gas inlet section 13 may not exist. In this case, each of the sample and the carrier gas is introduced to the inside of the guide section 10 via the sample inlet section 11. In addition, in this case, each of the sample introduction section 54 and the carrier gas introduction section 55 is connected to the sample inlet section 11.

The analysis apparatus 100 further includes an ionization section 20. The ionization section 20 generates sample component-derived ions by ionizing the sample. The sample component-derived ions indicate an ionized sample.

The ionization section 20 includes a reaction chamber 21, an electron emission element 22, and a counter electrode 23. The ionization section 20 is located downstream of the sample inlet section 11 in the movement direction X. The ionization section 20 is located between the first carrier gas inlet section 12 and the second carrier gas inlet section 13.

The electron emission element 22 indicates an element which emits an electron in a case where a voltage is applied. The electron emission element 22 and the counter electrode 23 are disposed with an interval therebetween along a width direction Y. The width direction Y indicates a direction which is perpendicular to the movement direction X. Each of the electron emission element 22 and the counter electrode 23 is insulated in order to suppress an electric discharge from a vicinity of each of the electron emission element 22 and the counter electrode 23. The reaction chamber 21 is located between the electron emission element 22 and the counter electrode 23.

The reaction chamber 21 is an empty space which is located in the inside of the guide section 10. The reaction chamber 21 is located downstream of the sample inlet section 11 in the movement direction X. Accordingly, the sample introduction section 54 is capable of introducing the sample to the reaction chamber 21 via the sample inlet section 11.

In addition, the reaction chamber 21 is located downstream of the first carrier gas inlet section 12 in the movement direction X. Accordingly, the carrier gas introduction section 55 is capable of introducing the carrier gas to the reaction chamber 21 via the first carrier gas inlet section 12.

The electron emission element 22 is capable of emitting the electron to an empty space at atmospheric pressure. The electron emission element 22 emits the electron to the reaction chamber 21. In a case where the voltage is applied between the electron emission element 22 and the counter electrode 23, the electron emission element 22 emits the electron toward the counter electrode 23. Furthermore, in the reaction chamber 21, the electron is moved toward the counter electrode 23 along the width direction Y.

The analysis apparatus 100 further includes a power supply section 53.

The power supply section 53 is connected to the electron emission element 22 and the counter electrode 23. The power supply section 53 applies the voltage between the electron emission element 22 and the counter electrode 23 to cause the electron emission element 22 to emit the electron to the counter electrode 23 via the reaction chamber 21. The power supply section 53 applies the voltage between the electron emission element 22 and the counter electrode 23 such that potential of the counter electrode 23 is higher than potential of the electron emission element 22.

Hereinabove, as described with reference to FIGS. 1 and 2, the sample, which flows in the inside of the guide section 10 via the sample inlet section 11, is introduced to the reaction chamber 21. Furthermore, in the reaction chamber 21, the electron, which is emitted from the electron emission element 22, is attached to the sample which is the molecule. In this case, the electron is attached to the sample due to electron attachment phenomenon. Furthermore, in a case where the electron is attached to the sample, the sample is ionized. As a result, the sample-derived ions are generated. In the first embodiment, negative ions are generated in the reaction chamber 21. Meanwhile, positive ions may be generated in the reaction chamber 21.

In addition, the analysis apparatus 100 generates the sample-derived ions by using the electron emission element 22. Accordingly, the analysis apparatus 100 is capable of generating the ions without using a radioactive source. As a result, it is possible to easily ionize the sample without any notice or management particular to a radioactive material.

In addition, the analysis apparatus 100 is capable of generating the ions by using the electron emission element 22 without the corona discharging. Accordingly, it is possible to inhibit ozone from being generated and it is possible to inhibit ionization of the sample from being suppressed due to the ozone. As a result, it is possible to easily ionize the sample.

In addition, by using the electron emission element 22 as an ionization source for ionizing the sample, it is possible to simplify a configuration of the ionization section 20. As a result, it is possible to miniaturize a power source of the analysis apparatus 100.

In addition, by using the electron emission element 22 as the ionization source, it is possible to miniaturize the power source of the analysis apparatus 100, compared to a case where the radioactive source or the corona discharging is used as the ionization source. As a result, it is possible to miniaturize the analysis apparatus 100. In addition, by using the FAIMS as the analysis apparatus 100, it is possible to further miniaturize the analysis apparatus 100.

Meanwhile, in a case where humidity of the reaction chamber 21 is too high, the electron captures moisture of the atmosphere in the reaction chamber 21 and, furthermore, the sample easily absorbs the moisture. As a result, there is a problem in that the ionization of the sample is inhibited. Here, the carrier gas introduction section 55 may introduce the carrier gas with prescribed humidity to the reaction chamber 21. As a result, it is possible to adjust the humidity of the reaction chamber 21, and thus it is possible to inhibit the ionization of the sample from being suppressed. Meanwhile, for example, in a case where the ions, such as the negative ions, which are insensitive to the humidity, are generated in the reaction chamber 21, the prescribed humidity indicates humidity which is equal to or less than 10%. In contrast, for example, in a case where the ions, such as the positive ions, which are sensitive to the humidity, are generated in the reaction chamber 21, the prescribed humidity indicates humidity which is equal to or less than 1%. Meanwhile, the prescribed humidity indicates, desirably, humidity which produces a dew point of 0° or less at a certain temperature.

Meanwhile, it is possible to apply the configuration, in which the carrier gas with the prescribed humidity is introduced to the reaction chamber 21, to second to sixth embodiments which will be described later.

Meanwhile, it is preferable that a temperature of the carrier gas, which is introduced to the reaction chamber 21 by the carrier gas introduction section 55, is a prescribed temperature. The prescribed temperature is higher than a temperature of the atmosphere of the reaction chamber 21 and, for example, is equal to or higher than 50° C. As a result, it is possible to effectively lower the humidity of the reaction chamber 21, and it is possible to effectively inhibit the ionization of the sample from being suppressed. Meanwhile, it is also possible to apply the configuration in which the temperature of the carrier gas, which is introduced to the reaction chamber 21, is the prescribed temperature, to the second to sixth embodiments which will be described later.

In addition, in the first embodiment, the analysis apparatus 100 generates the negative ions from the sample, and analyzes the sample using the negative ions. Accordingly, by using the negative ions, it is possible to ionize the sample by using a low energy electron. In addition, since the low energy electron is used, it is possible to inhibit the sample from being decomposed in a case where the sample is ionized. In addition, the negative ions are hardly affected by the humidity compared to the positive ions, and thus it is possible to stably generate the negative ions.

Subsequently, the analysis apparatus 100 will be further described with reference to FIGS. 1 to 4B.

As illustrated in FIGS. 1 and 2, the analysis apparatus 100 further includes a field asymmetric ion separation section 30.

The ion separation section 30 separates the ions in accordance with mobility of the ions. The ion separation section 30 is located downstream of the ionization section 20 in the movement direction X. In addition, the ion separation section 30 is located downstream of the second carrier gas inlet section 13 in the movement direction X.

The ion separation section 30 includes a field asymmetric ion movement section 31, a first electrode 32, a second electrode 33, a distribution voltage generation section 51, and a compensation voltage generation section 52.

The first electrode 32 and the second electrode 33 are disposed with an interval therebetween along the width direction Y. For example, the interval between the first electrode 32 and the second electrode 33 is equal to or larger than 0.001 mm and is equal to or less than 2 mm. For example, dimensions of the first electrode 32 and the second electrode 33 in the movement direction X are equal to or larger than 0.1 mm or is equal to or less than 30 mm. The field asymmetric ion movement section 31 is located between the first electrode 32 and the second electrode 33.

The field asymmetric ion movement section 31 is an empty space which is located in the inside of the guide section 10. The field asymmetric ion movement section 31 is located downstream of the reaction chamber 21 in the movement direction X. The field asymmetric ion movement section 31 is located between the first electrode 32 and the second electrode 33. The field asymmetric ion movement section 31 is an example of the ion movement section of the disclosure.

The ions which are generated in the reaction chamber 21 move toward the field asymmetric ion movement section 31, together with the carrier gas. Meanwhile, the ions which are generated in the reaction chamber 21 may move toward the field asymmetric ion movement section 31 due to a potential gradient according to a potential difference between the reaction chamber 21 and the field asymmetric ion movement section 31. In addition, the ions which are generated in the reaction chamber 21 may move toward the field asymmetric ion movement section 31 due to the carrier gas and the potential gradient.

The distribution voltage generation section 51 includes an alternating current voltage power source. The distribution voltage generation section 51 generates a distribution voltage (DV) obtained by superimposing a high frequency voltage. Furthermore, the distribution voltage generation section 51 applies a high-frequency electric field between the first electrode 32 and the second electrode 33 by applying the distribution voltage to the second electrode 33.

The ions which are generated in the reaction chamber 21 reach the field asymmetric ion movement section 31. Furthermore, when moving in the field asymmetric ion movement section 31, the ions tremble due to a change in mobility according to the distribution voltage. As a result, an ion movement direction changes.

Figure 3:
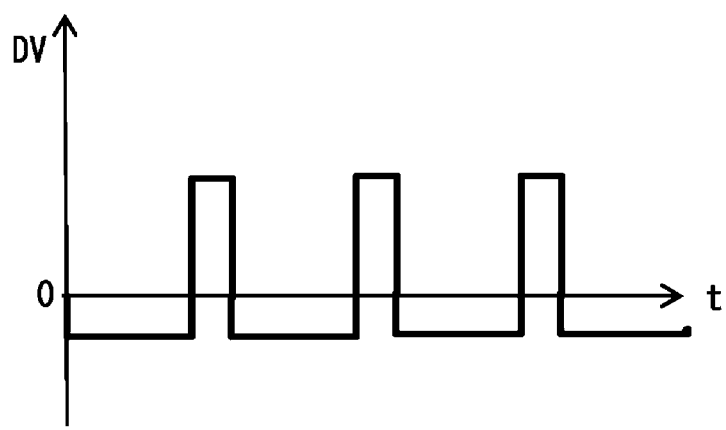
FIG. 3 is a graph illustrating an example of a profile of a distribution voltage which is generated from a distribution voltage generation section.

FIG. 3 is a graph illustrating an example of a profile of the distribution voltage which is generated from the distribution voltage generation section 51.

As illustrated in FIG. 3, the distribution voltage is applied such that a high voltage (positive voltage) and a low voltage (negative voltage) are repeated at every fixed period. In addition, the distribution voltage is applied such that an average value of the distribution voltage becomes 0 V in one cycle of a waveform of the distribution voltage. In addition, for example, an absolute value of the distribution voltage is equal to or higher than 100 V and is equal to or lower than 2000 V. In addition, for example, an absolute value of electrolysis strength generated due to the distribution voltage is equal to or larger than 5000 V/cm and is equal to or less than 40000 V/cm. In addition, for example, a frequency of the distribution voltage is equal to or higher than 100 kHz and is equal to or lower than 3 MHz.

As illustrated in FIG. 1, the compensation voltage generation section 52 includes a direct current voltage power source. The compensation voltage generation section 52 generates a compensation voltage (CV). Furthermore, the compensation voltage generation section 52 applies the compensation voltage to the second electrode 33. Furthermore, the mobility of the ions changes due to the compensation voltage and the movement direction of ions changes in accordance with the mobility of the ions. As a result, the ions under moving in the field asymmetric ion movement section 31 are separated in accordance with the mobility of the ions.

The ions which reach the first electrode 32 or the second electrode 33 become a neutral substance. The neutral substance is discharged to the outside of the guide section 10, together with the carrier gas. However, in a case where the neutral substance is not discharged but stored in the first electrode 32, the second electrode 33, or the ion detection section 40, which will be described later, it is possible to discharge the neutral substance to the outside of the guide section 10 by introducing the carrier gas to the inside of the guide section 10 via the sample inlet section 11, the first carrier gas inlet section 12, and/or the second carrier gas inlet section 13. In this case, it is preferable that the temperature of the carrier gas is equal to or higher than 50° C.

Figure 4A:
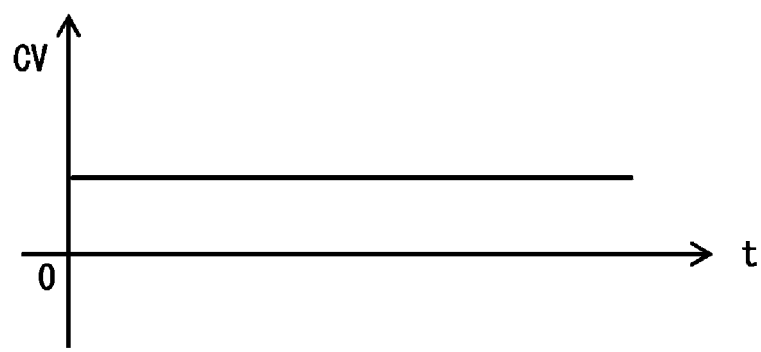
FIGS. 4A and 4B are graphs illustrating examples of a profile of a compensation voltage which is generated from a compensation voltage generation section.
Figure 4B:
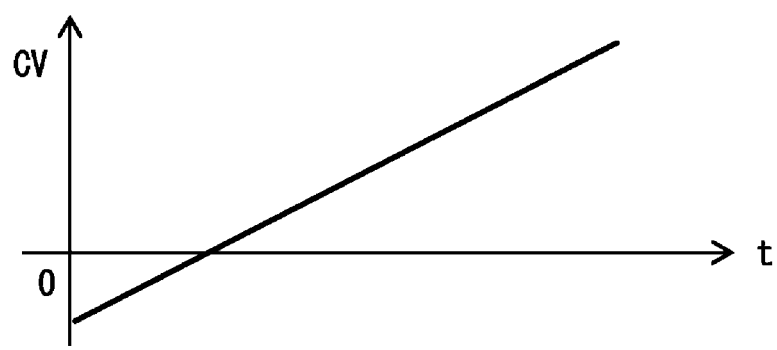

FIGS. 4A and 4B are graphs illustrating examples of a profile of the compensation voltage which is generated from the compensation voltage generation section 52. In a case where separation is performed, the compensation voltage mostly has an approximately fixed value as illustrated in FIG. 4A. In a case where analysis is performed, as illustrated in FIG. 4B, the strength of the ions which move changes by time by scanning the compensation voltage, with the result that a spectrum is acquired, and thus it is possible to perform analysis. For example, the compensation voltage is equal to or higher than −100 V and is equal to or lower than 100 V. In addition, for example, the electrolysis strength which is generated due to the compensation voltage is equal to or higher than −2000 V/cm and is equal to or lower than 2000 V/cm.

Subsequently, the analysis apparatus 100 will be further described with reference to FIGS. 1 and 2.

As illustrated in FIGS. 1 and 2, the analysis apparatus 100 further includes an exhaust port section 14, the ion detection section 40, and an exhaust section 56.

The ion detection section 40 detects the ions which pass through the ion separation section 30. Specifically, the ion detection section 40 detects the ions which pass through the field asymmetric ion movement section 31. The ion detection section 40 is located downstream of the field asymmetric ion movement section 31 in the movement direction X.

The ion detection section 40 includes a first ion detector 41, a second ion detector 42, and a third ion detector 43.

Each of the first ion detector 41, the second ion detector 42, and the third ion detector 43 includes, for example, a potential ion detector, a multi-channel plate, or a Faraday cup.

Meanwhile, in the first embodiment, the three ion detectors are provided. However, the number of ion detectors is not particularly limited. One ion detector may be provided or a plurality of ion detectors, other than 3, may be provided. Meanwhile, in a case where the plurality of ion detectors are provided, it is possible to shorten ion detection time, and, furthermore, it is possible to perform verification while comparing the detection results of the plurality of respective ion detectors with each other.

The exhaust port section 14 is an opening section which leads to the inside of the guide section 10. The exhaust port section 14 is formed the most downstream of the guide section 10 in the movement direction X. The exhaust port section 14 is located downstream of the ion detection section 40 in the movement direction X.

The exhaust section 56 includes, for example, an exhaust pump. The exhaust section 56 discharges the carrier gas and the neutral substances to the outside of the guide section 10 via the exhaust port section 14.

Meanwhile, after cleaning the carrier gas which is discharged from the exhaust section 56 by using a filter and, furthermore, performing dry as occasion demands, the exhaust section 56 may introduce the carrier gas to the inside of the guide section 10 using a circulating pump via the first carrier gas inlet section 12 and/or the second carrier gas inlet section 13. As a result, it is possible to circulate the carrier gas, and it is possible to reasonably construct the analysis apparatus 100.

In addition, the carrier gas and the neutral substance may be discharged from the exhaust port section 14 to the outside of the guide section 10 by using the atmospheric pressure of the carrier gas. In this case, the exhaust section 56 is not desired, and thus it is possible to simply construct the analysis apparatus 100.

The analysis apparatus 100 further includes a controller 61, an input unit 62, and a storage unit (not illustrated in the drawing).

The controller 61 includes a processor such as a central processing unit (CPU) or a micro processing unit (MPU). The controller 61 controls the respective elements of the analysis apparatus 100. Specifically, the processor of the controller 61 controls the distribution voltage generation section 51, the compensation voltage generation section 52, the power supply section 53, the sample introduction section 54, the carrier gas introduction section 55, and the exhaust section 56 by running a computer program stored in the storage unit such as a HDD.

The input unit 62 receives an instruction with respect to the analysis apparatus 100. The input unit 62 is connected to the controller 61. Information, which indicates content of the instruction received by the input unit 62, is transmitted to the controller 61. As a result, the controller 61 controls the respective elements of the analysis apparatus 100 in accordance with the content of the instruction received by the input unit 62.

In an inside N1 of the guide section 10, the reaction chamber 21, the electron emission element 22, the counter electrode 23, the first electrode 32, the second electrode 33, the first ion detector 41, the second ion detector 42, and the third ion detector 43 are disposed. In the inside N1 of the guide section 10, ions are generated by the ionization section 20 and the ions are separated by the ion separation section 30. In the inside N1 of the guide section 10, the sample is introduced from the sample inlet section 11. In the inside N1 of the guide section 10, the carrier gas is introduced from each of the first carrier gas inlet section 12 and the second carrier gas inlet section 13. The carrier gas in the inside N1 of the guide section 10 is discharged from the exhaust port section 14.

Figure 5:
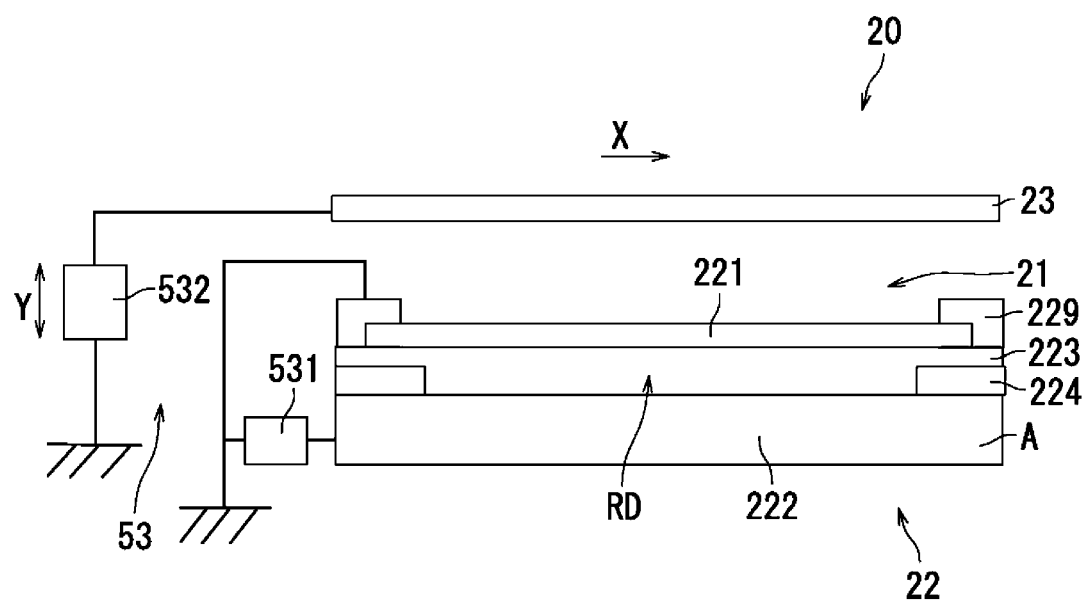
FIG. 5 is an outline diagram illustrating an electron emission element.

Subsequently, the electron emission element 22 will be described with reference to FIG. 5. FIG. 5 is an outline diagram illustrating the electron emission element 22.

As illustrated in FIG. 5, the electron emission element 22 includes a surface electrode 221, a lower part electrode 222, an intermediate layer 223, an insulating layer 224, and a wiring electrode 229. In addition, the power supply section 53 includes a first power supply section 531 and a second power supply section 532.

The surface electrode 221 faces the reaction chamber 21. In addition, the surface electrode 221 faces the counter electrode 23 with the reaction chamber 21 interposed therebetween. The reaction chamber 21 is located between the surface electrode 221 and the counter electrode 23.

For example, an interval between the counter electrode 23 and the surface electrode 221 is equal to or higher than 0.1 mm and is equal to or less than 5 mm. It is preferable that the interval between the counter electrode 23 and the surface electrode 221 is equal to or larger than 0.1 mm and is equal to or less than 3 mm. Further, it is preferable that the interval between the counter electrode 23 and the surface electrode 221 is equal to or higher than 1 mm and is equal to or less than 2 mm.

The surface electrode 221 and the lower part electrode 222 are disposed with an interval therebetween. The intermediate layer 223 is disposed between the surface electrode 221 and the lower part electrode 222. The intermediate layer 223 has prescribed volume resistivity such that the intermediate layer 223 has high resistance. For example, the prescribed volume resistivity is equal to or higher than $1 \times 10^5$ ($\Omega \cdot m$) and is equal to or lower than $1 \times 10^9$ ($\Omega \cdot m$).

The surface electrode 221 is located between the intermediate layer 223 and the reaction chamber 21.

In a case where a substrate A is a conductive substrate made of metal or the like, the lower part electrode 222 may be the substrate A. In addition, in a case where the substrate A is a plate which is formed of an insulator, a metal layer or a conductor layer may be provided on the substrate A. The insulating layer 224 is formed on the substrate A.

The insulating layer 224 is formed of a material which has insulating properties. The insulating layer 224 cuts off a current which flows from the lower part electrode 222 to the surface electrode 221.

An electron emission field RD is a field which does not include the insulating layer 224.

The first power supply section 531 applies the voltage between the surface electrode 221 and the lower part electrode 222. The first power supply section 531 is connected to the surface electrode 221 through the wiring electrode 229. In a case where the voltage is applied between the surface electrode 221 and the lower part electrode 222, an electric filed is generated in the intermediate layer 223, the electron is generated in the intermediate layer 223 due to the electric field, and the electron is emitted to the reaction chamber 21 after passing through a part corresponding to the surface electrode 221. In a case where humidity of the inside N1 of the guide section 10 illustrated in FIG. 1 is approximately fixed, the quantity of electrons which are emitted from the electron emission element 22 becomes larger as the voltage which is applied to the electron emission element 22 by the first power supply section 531 becomes higher. A fact that the voltage is applied to the electron emission element 22 indicates a fact that the voltage is applied between the surface electrode 221 and the lower part electrode 222. In addition, the quantity of electrons which are emitted from the electron emission element 22 indicates the quantity of electrons which are emitted from the surface electrode 221 to the reaction chamber 21.

For example, the voltage, which is applied between the surface electrode 221 and the lower part electrode 222, is equal to or higher than 1 V and is equal to or lower than 100 V. It is preferable that the voltage which is applied between the surface electrode 221 and the lower part electrode 222 is equal to or higher than 5 V and is equal to or lower than 30 V. It is preferable that the voltage which is applied between the surface electrode 221 and the lower part electrode 222 is equal to or higher than 10 V and is equal to or lower than 20 V.

For example, an electric field strength between the surface electrode 221 and the lower part electrode 222 is equal to or larger than 1 kV/cm and is equal to or less than 1000 kV/cm. It is preferable that the electric field strength between the surface electrode 221 and the lower part electrode 222 is equal to or larger than 50 kV/cm and is equal to or less than 500 kV/cm.

The second power supply section 532 applies the voltage to the counter electrode 23. In a case where the second power supply section 532 applies the voltage to the counter electrode 23, the electrons which are emitted to the reaction chamber 21 via a part corresponding to the surface electrode 221 are gravitated toward the counter electrode 23 due to the electric field of the counter electrode 23. Meanwhile, the first power supply section 531 and the second power supply section 532 apply the voltage between the counter electrode 23 and the surface electrode 221 such that the potential of the counter electrode 23 is higher than potential of the surface electrode 221. For example, the voltage which is applied between the counter electrode 23 and the surface electrode 221 is equal to or higher than 100 V and is equal to or lower than a few thousand V.

Meanwhile, an orientation of the electric field between the surface electrode 221 and the counter electrode 23 and an orientation of the electric field between the first electrode 32 and the second electrode 33, which are illustrated in FIG. 1, may be the same with each other or may be different from each other.

Energy of the electron which is emitted from the electron emission element 22 will be described.

It is preferable that the electron which is emitted from the electron emission element 22 is a low energy electron to the extent that the electron attachment phenomenon occurs. For example, the energy of the electron which is emitted from the electron emission element 22 is higher than 0 eV and is equal to or lower than 10 eV. Accordingly, in a case where the electron emission element 22 emits the low energy electron, the low energy electron is attached to the sample due to the electron attachment phenomenon. As a result, it is possible to suppress transmutation of the sample, and it is possible to improve ion detection sensitivity. Meanwhile, the transmutation of the sample indicates a fact that the sample is decomposed due to the energy of the electron and thus a large quantity of decomposed products is generated.

Meanwhile, in a case where the energy of the electron is relatively small in a range of 0 eV to 10 eV, the electron is attached to the sample due to, for example, a non-dissociative electron capture reaction. In addition, in a case where the energy of the electron is relatively large in the range of 0 eV to 10 eV, the electron is attached to the sample due to, for example, a dissociative electron capture reaction. Meanwhile, a case where the electron is attached to the sample due to the non-dissociative electron capture reaction has an advantage in that it is possible to further improve ion detection sensitivity, compared to a case where the electron is attached to the sample due to the dissociative electron capture reaction.

Meanwhile, in a case where a relationship among a first voltage, a second voltage, and the energy of the electron is measured in advance, it is possible to calculate the energy of the electron based on the voltage which is applied by the power supply section 53. The first voltage indicates the voltage which is applied between the surface electrode 221 and the lower part electrode 222. The second voltage indicates the voltage which is applied between the surface electrode 221 and the counter electrode 23.

The humidity of the reaction chamber 21 will be described.

In a case where the humidity of the reaction chamber 21 is too high, the sample which is introduced to the reaction chamber 21 is neutralized by being attached to the surface electrode 221 of the electron emission element 22 or the counter electrode 23, and thus there is a problem in that the ionization of the sample is inhibited. Here, the sample introduction section 54 may introduce the sample to the reaction chamber 21 after the carrier gas introduction section 55 introduces the carrier gas with the prescribed humidity to the reaction chamber 21. Therefore, it is possible to introduce the sample to the reaction chamber 21 after lowering the humidity of the reaction chamber 21 by using the carrier gas. As a result, it is possible to inhibit the sample from being attached to the surface electrode 221 or the counter electrode 23, and it is possible to inhibit the ionization of the sample from being suppressed. Furthermore, it is possible to improve durability of the electron emission element 22. Furthermore, since it is possible to inhibit the sample from being attached to or from being stored in the surface electrode 221 or the counter electrode 23, it is possible to shorten time which is desired to maintain the surface electrode 221 and the counter electrode 23. In a case where it is possible to shorten time which is desired for maintenance, it is possible to shorten a time interval (recover time interval) which is desired until subsequent measurement using the electron emission element 22 is performed.

Meanwhile, it is possible to apply a configuration, in which the sample is introduced to the reaction chamber 21 after the carrier gas with the prescribed humidity is introduced to the reaction chamber 21, to the second to sixth embodiments which will be described later.

Subsequently, the intermediate layer 223 will be described with reference to FIG. 5.

As illustrated in FIG. 5, the intermediate layer 223 includes a resin and conductive microparticles, which are dispersed in the resin, in the first embodiment. For example, the resin is a silicone resin acquired through condensation polymerization of silanol ($R_3$—Si—OH). For example, a metal particle, such as gold, silver, platinum, or palladium, which has conductivity, may be used as the conductive microparticle. In addition, as a conductive material other than the metal particle, carbon, a conductive polymer, and/or a semiconductive material may be used. In the intermediate layer 223, a conductive microparticle content may be appropriately set. It is possible to adjust resistance of the intermediate layer 223 by changing the conductive microparticle content. The intermediate layer 223 is formed using, for example, a coating method such as a spin coating method, a doctor blade method, a spraying method, or a dipping method.

An example of a method for preparing the intermediate layer 223 will be described.

First, a silicone resin of 3 g which is the resin (a room temperature curing resin manufactured by Shin-Etsu Chemical Co., Ltd.) and an Ag nanoparticle of 0.03 g which is the conductive microparticle (an average diameter of 10 nm, a 1-nm film of insulation coating alcoholate manufactured by Nanoparticle Laboratory Corporation) are put in and mixed in a reagent bottle. As a result, a liquid mixture of the silicone resin and the Ag nanoparticle is produced. Subsequently, in a case where the liquid mixture, which is put in the reagent bottle, is further stirred using an ultrasonic vibrator, an application liquid is produced. A viscosity of the application liquid is, for example, 0.8 to 15 mPa·s. A resin component ratio in the application liquid is, for example, approximately 10 to 70 wt %. The application liquid becomes the silicone resin through condensation polymerization performed due to moisture in the atmosphere after being applied on the substrate A, thereby forming the intermediate layer 223.

In addition, it is possible for the surface electrode 221 to have a thickness which is equal to or larger than 5 nm and is equal to or less than 100 nm, and, preferably, which is equal to or larger than 40 nm and is equal to or less than 100 nm. In addition, a material of the surface electrode 221 includes, for example, at least one of a metal material, such as gold or platinum, a semiconductor, indium tin oxide (ITO) and the conductive material, such as carbon, which has high electrical conductivity such that excess destroy is suppressed as a whole. In addition, the surface electrode 221 may include a plurality of metal layers.

Even in a case where the thickness of the surface electrode 221 is equal to or larger than 40 nm, the surface electrode 221 may include a plurality of openings, interstices, and/or a part which is thinned to a thickness that is equal to or less than 10 nm. It is possible for the electron which is generated in the intermediate layer 223 to pass through or penetrate the openings, the interstices, and/or the part which is thinned, and thus it is possible to emit the electron from the surface electrode 221. The openings, the interstices, and/or the part which is thinned are formed by performing a thin film forming process (a sputtering method or an evaporation method), which accompanies a general patterning process, on the metal which forms the surface electrode 221.

In addition, the material of the lower part electrode 222 is, for example, aluminum, stainless steel, nickel, or the like. For example, the thickness of the lower part electrode 222 is equal to or larger than 200 μm and is equal to or less than 1 mm.

Second Embodiment

Figure 6:
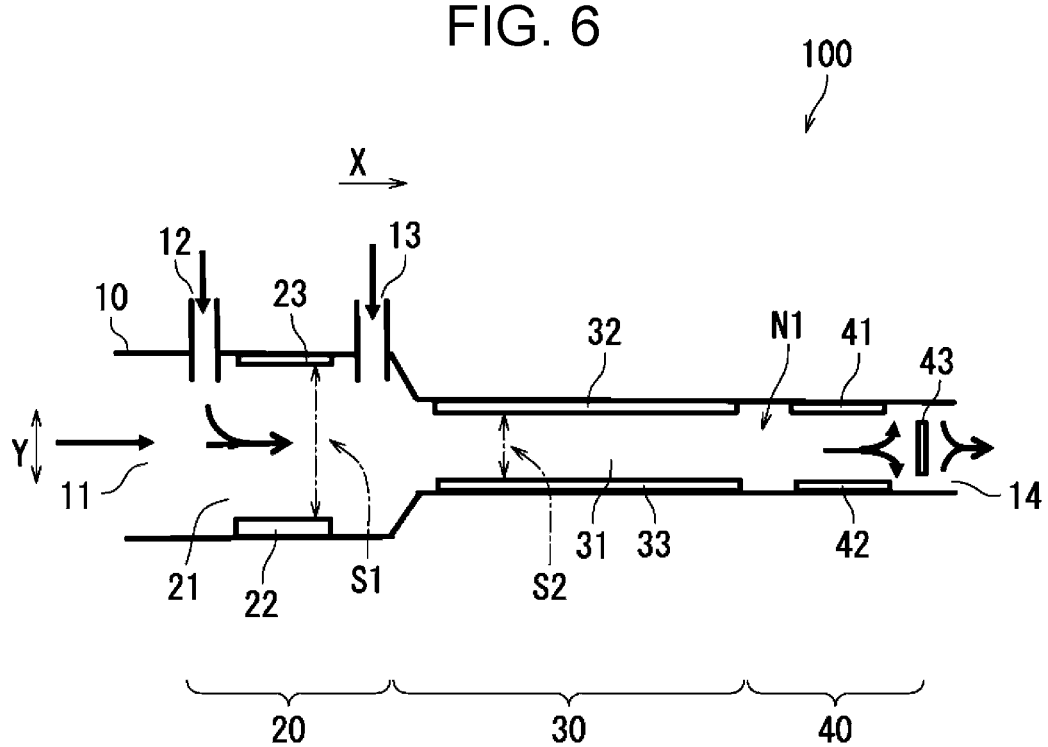
FIG. 6 is a schematic diagram illustrating a second embodiment of the analysis apparatus.

Subsequently, the second embodiment of the analysis apparatus 100 will be described with reference to FIG. 6. FIG. 6 is a schematic diagram illustrating the second embodiment of the analysis apparatus 100.

The second embodiment is different from the first embodiment in a fact that a passage area S1 of the reaction chamber 21 and a passage area S2 of the field asymmetric ion movement section 31 are different from each other. Hereinafter, a point which is different from the first embodiment will be mostly described.

As illustrated in FIG. 6, the analysis apparatus 100 of the second embodiment is the FAIMS.

The passage area S1 of the reaction chamber 21 is larger than the passage area S2 of the field asymmetric ion movement section 31. As a result, it is possible for the sample and the carrier gas to smoothly flow from the reaction chamber 21 to the field asymmetric ion movement section 31.

Meanwhile, the passage area S1 of the reaction chamber 21 indicates an area corresponding to a cross section, which is perpendicular to the movement direction X, of the reaction chamber 21. The passage area S2 of the field asymmetric ion movement section 31 indicates an area corresponding to a cross section, which is perpendicular to the movement direction X, of the field asymmetric ion movement section 31.

Third Embodiment

Figure 7:
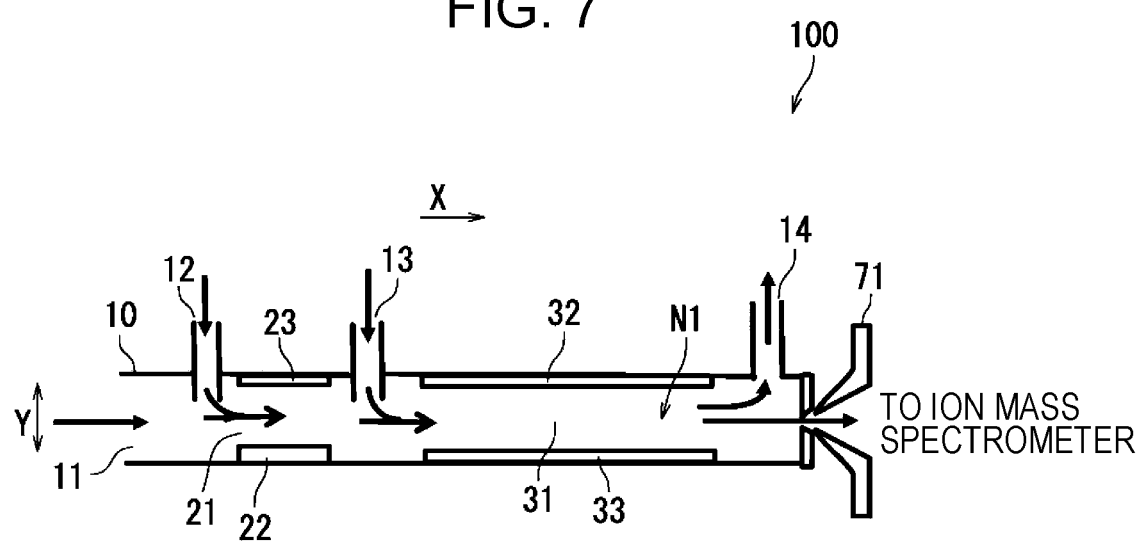
FIG. 7 is a schematic diagram illustrating a third embodiment of the analysis apparatus.

Subsequently, the third embodiment of the analysis apparatus 100 will be described with reference to FIG. 7. FIG. 7 is a schematic diagram illustrating the third embodiment of the analysis apparatus 100.

The third embodiment is different from the first embodiment in a fact that sample mass spectrometry is performed. Hereinafter, a point which is different from the first embodiment will be mostly described.

As illustrated in FIG. 7, the analysis apparatus 100 of the third embodiment is the FAIMS.

The analysis apparatus 100 further includes a skimmer (interface) 71. The skimmer 71 is located downstream of the field asymmetric ion movement section 31 in the movement direction X. An ion mass spectrometer (not illustrated in the drawing) is disposed downstream of the skimmer 71 in the movement direction X.

After the ions pass through the skimmer 71, the ions are guided to the ion mass spectrometer. The ion mass spectrometer detects the ions, and performs ion mass spectrometry. As a result, it is possible to determine the quantity of prescribed components in the sample. The ion mass spectrometer is an example of the ion detection section of the disclosure.

Fourth Embodiment

Figure 8:
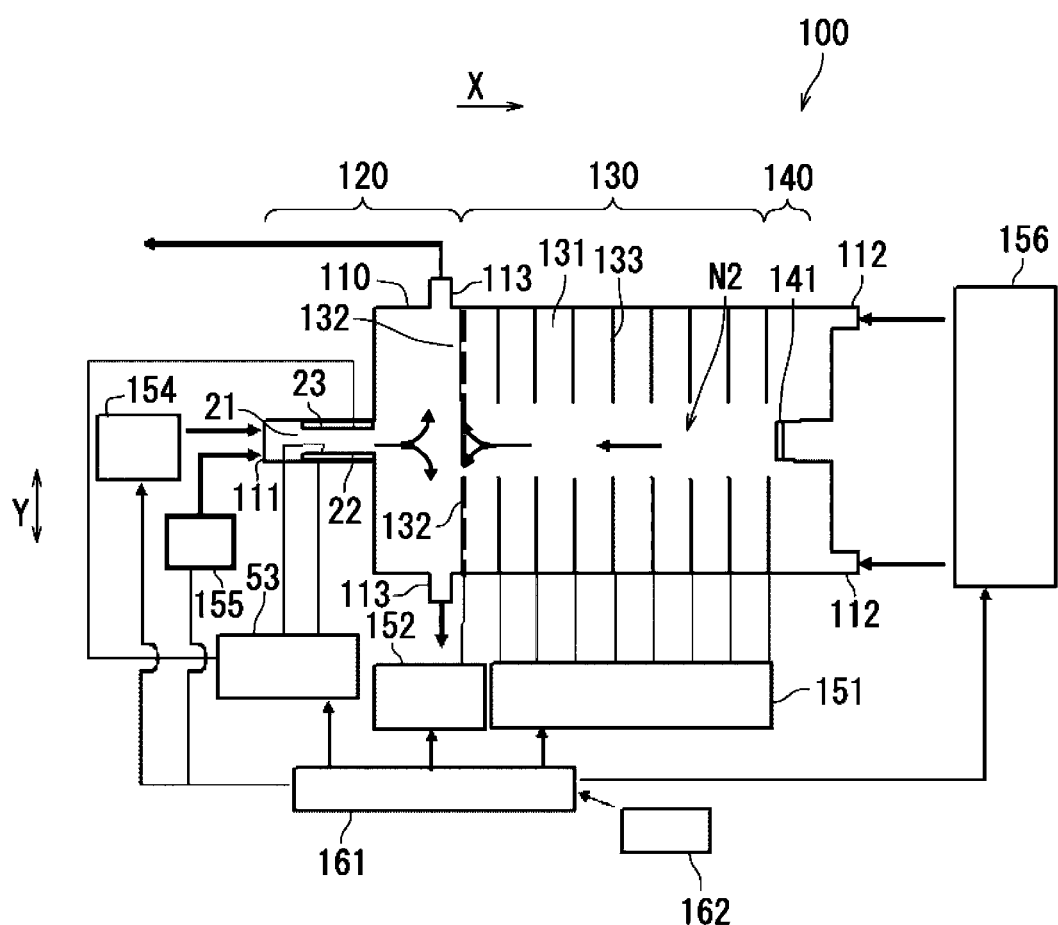
FIG. 8 is a schematic diagram illustrating a fourth embodiment of the analysis apparatus.
Figure 9:
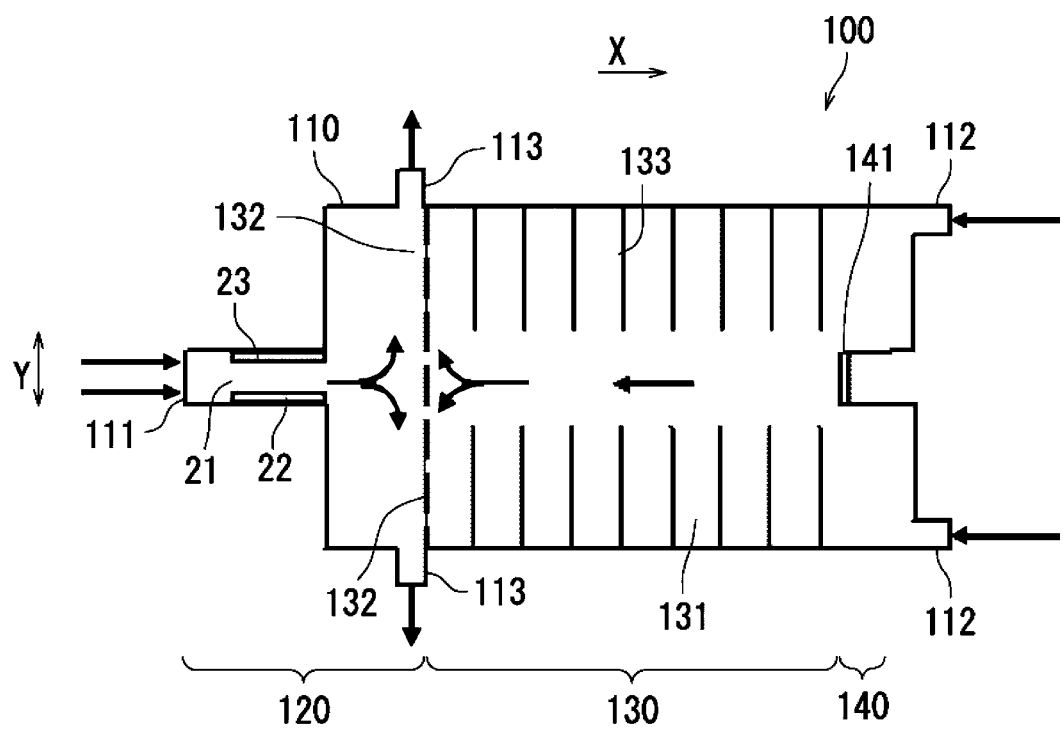
FIG. 9 is a partially enlarged diagram illustrating the fourth embodiment of the analysis apparatus.

Subsequently, the fourth embodiment of the analysis apparatus 100 will be described with reference to FIGS. 8 and 9. FIG. 8 is a schematic diagram illustrating the fourth embodiment of the analysis apparatus 100. FIG. 9 is a partially enlarged diagram illustrating the fourth embodiment of the analysis apparatus 100.

The analysis apparatus 100 of the fourth embodiment includes an ion separation section 130 whose configuration is different from those of the first to third embodiments. Hereinafter, a point which is different from the first embodiment will be mostly described.

The analysis apparatus 100 of the fourth embodiment is a drift tube-type ion mobility spectrometry apparatus (drift tube-type IMS apparatus).

The analysis apparatus 100 includes a guide section 110, a sample inlet section 111, a drift gas inlet section 112, an exhaust port 113, a sample introduction section 154, a carrier gas introduction section 155, and a drift gas introduction section 156.

The guide section 110 guides the ions. The guide section 110 is formed in a tube shape. An ion movement path, which extends along the movement direction X, is formed in the inside of the guide section 110. The movement direction X indicates a movement direction of the ions which are moved toward the ion detection section 140 from the reaction chamber 21. The shape of the guide section 110 is not limited to the tube shape. The guide section 110 may have a hollow shape. The guide section 110 is a second example of a casing of the disclosure.

The sample inlet section 111 is formed the uppermost stream of the guide section 110 in the movement direction X. The sample introduction section 154 introduces the sample to the inside of the guide section 110 through the sample inlet section 111. The carrier gas introduction section 155 introduces the carrier gas to the inside of the guide section 110 through the sample inlet section 111. The carrier gas is moved in the inside the guide section 110 toward downstream of the movement direction X.

The drift gas inlet section 112 is formed the most downstream of the guide section 110 in the movement direction X. The drift gas introduction section 156 introduces the drift gas to the inside of the guide section 110 through the drift gas inlet section 112. It is preferable that the drift gas is dry nitrogen or dry air. In addition, it is preferable that the drift gas is dry nitrogen or dry air which passes through a filter that is capable of removing impurities. The exhaust port 113 is located in a middle section of the guide section 110 in the movement direction X.

The analysis apparatus 100 further includes an ionization section 120. The ionization section 120 includes the reaction chamber 21, the electron emission element 22, and the counter electrode 23. The reaction chamber 21 is located downstream of the sample inlet section 11 in the movement direction X. The reaction chamber 21 is located between the counter electrode 23 and the electron emission element 22. Specifically, the reaction chamber 21 is formed between the counter electrode 23 and the surface electrode 221 of the electron emission element 22 (refer to FIG. 5). The reaction chamber 21 is formed, for example, in an approximately square pole.

The analysis apparatus 100 further includes a power supply section 53. The power supply section 53 emits the electron toward the counter electrode 23 from the electron emission element 22 through the reaction chamber 21 by applying the voltage between the electron emission element 22 and the counter electrode 23.

The sample, which flows in the inside of the guide section 110 through the sample inlet section 111, is introduced to the reaction chamber 21. Furthermore, in the reaction chamber 21, the electron which is emitted from the electron emission element 22 is attached to the sample due to the electron attachment phenomenon. Furthermore, in a case where the electron is attached to the sample, the sample is ionized. As a result, the sample-derived ions are generated.

The analysis apparatus 100 further includes the drift tube-type ion separation section 130.

The ion separation section 130 separates ions according to the mobility of the ions. The ion separation section 130 is located downstream of the ionization section 120 in the movement direction X.

The ion separation section 130 includes a drift section 131, a gate 132, a plurality of separated electrodes 133, a drift voltage generation section 151, and a gate voltage generation section 152.

The drift section 131 is an empty space which is located in the inside of the guide section 110. The drift section 131 is located downstream of the reaction chamber 21 in the movement direction X. The drift gas is introduced to the drift section 131 from the drift gas inlet section 112. The drift gas is moved in the drift section 131 toward upstream of the movement direction X. The atmospheric pressure of the drift section 131 is held in approximately atmospheric pressure or a low-vacuum state of hundreds Pa due to the drift gas.

The exhaust port 113 is located between the drift section 131 and the reaction chamber 21. The carrier gas and the drift gas join in the inside of the guide section 110 and are emitted from the exhaust port 113 to the outside of the guide section 110.

The gate 132 dams the ions which are generated in the reaction chamber 21. The gate 132 is located between the reaction chamber 21 and the drift section 131. The gate 132 includes a grid electrode. The gate voltage generation section 152 sets up potential of the gate 132 by applying the voltage to the gate 132. The potential of the gate 132 is set to high potential in order to dam the ions. The high potential indicates potential which is higher than respective potentials of the plurality of separated electrodes 133 and is higher than the potential of the counter electrode 23.

The plurality of respective separated electrodes 133 are formed in a circular shape. The plurality of separated electrodes 133 are disposed in the drift section 131 and are arranged along the movement direction X. The drift voltage generation section 151 applies the voltage to the plurality of respective separated electrodes 133. As a result, a direct current field (electrostatic field) is formed in the drift section 131. The direct current field has a potential gradient in which an inclination is fixed along the movement direction X.

Subsequently, an operation of the ion separation section 130 will be described.

The gate voltage generation section 152 applies a prescribed voltage to the gate 132 at prescribed timing, and converts the potential of the gate 132 into intermediate potential from the high potential. The intermediate potential indicates potential which is higher than the potential of the counter electrode 23 and is lower than the potential of each of the plurality of separated electrodes 133. As a result, the ions which are dammed by the gate 132 pass through the gate 132 and are introduced to the drift section 131.

The ions which are introduced to the drift section 131 are accelerated due to the direct current field and are moved in the movement direction X. In this case, the ions are moved in the movement direction X while colliding with the drift gas. In a case where the ions collide with the drift gas, a speed of movement of the ions converges on a fixed speed according to the mobility of the ions. As a result, the ions which are being moved in the drift section 131 are separated according to the mobility of the ions.

The ion detection section 140 detects the ions which pass through the ion separation section 130. Specifically, the ion detection section 140 detects the ions which pass through the drift section 131. The ion detection section 140 is located downstream of the drift section 131 in the movement direction X. The ion detection section 140 includes an ion detector 141. The ion detector 141 has, for example, the same structure as the first ion detector 41 of the first embodiment.

In a case where the ions are moved in the drift section 131, the speed of the movement of the ions changes due to a difference in the mobility of the ions. Accordingly, time in which the ions reach the ion detector 141 changes according to the mobility of the ions. As a result, in a case where ion movement time and ion signal strength, which is detected by the ion detector 141, are plotted on a prescribed graph, it is possible to acquire a spectrum of the mobility of the ions. The ion movement time indicates time which is demanded until the ions reach the ion detector 141 after the potential of the gate 132 is converted into the intermediate potential. The ion signal strength indicates a physical quantity according to the mobility of the ions. The prescribed graph is, for example, a graph in which a horizontal axis indicates the time and a vertical axis indicates the ion signal strength.

Meanwhile, ions, which are attached to an obstacle, such as the separated electrodes 133, while not reaching the ion detector 141, are neutralized and become a neutral substance. The neutral substance is discharged from the exhaust port 113, together with the carrier gas. However, there is a case where the neutral substance is stored in the ionization section 120, the gate 132, the ion separation section 130, and/or the ion detection section 140. In this case, a clean gas, such as clean dry air, which does not include the sample, may be introduced to the inside of the guide section 110 from the sample inlet section 111 and/or the drift gas inlet section 112 such that the neutral substance is discharged from the exhaust port 113. Accordingly, it is possible to discharge the neutral substance to the outside of the guide section 110, together with the clean gas. Meanwhile, it is preferable that a temperature of the clean gas is, for example, a high temperature which is equal to or higher than 50° C.

The analysis apparatus 100 further includes a controller 161, an input unit 162, and a storage unit (not illustrated in the drawing).

The controller 161 controls the drift voltage generation section 151, the gate voltage generation section 152, the power supply section 53, the sample introduction section 154, the carrier gas introduction section 155, and the drift gas introduction section 156 by running a computer program stored in the storage unit. The input unit 162 receives an instruction with respect to the analysis apparatus 100.

In an inside N2 of the guide section 110, the reaction chamber 21, the electron emission element 22, the counter electrode 23, the drift section 131, the gate 132, and the ion detector 141 are disposed. In the inside N2 of the guide section 110, the ions are generated by the ionization section 120 and the ions are separated by the ion separation section 130. The sample and the carrier gas are introduced to the inside N2 of the guide section 110 from the sample inlet section 111. The drift gas is introduced to the inside N2 of the guide section 110 from the drift gas inlet section 112. The carrier gas and the drift gas in the inside N2 of the guide section 110 are discharged from the exhaust port 113. In a case where humidity of the inside N2 of the guide section 110 is approximately fixed, the quantity of electrons, which are emitted from the electron emission element 22, becomes larger as the voltage, which is applied to the electron emission element 22 by the first power supply section 531 (refer to FIG. 5), becomes higher.

Hereinabove, as being described with reference to FIGS. 8 and 9, the sample-derived ions are generated using the electron emission element 22. Accordingly, it is possible to generate the ions without using the radioactive source and the corona discharging. Accordingly, it is possible to easily ionize the sample.

Fifth Embodiment

Figure 10:
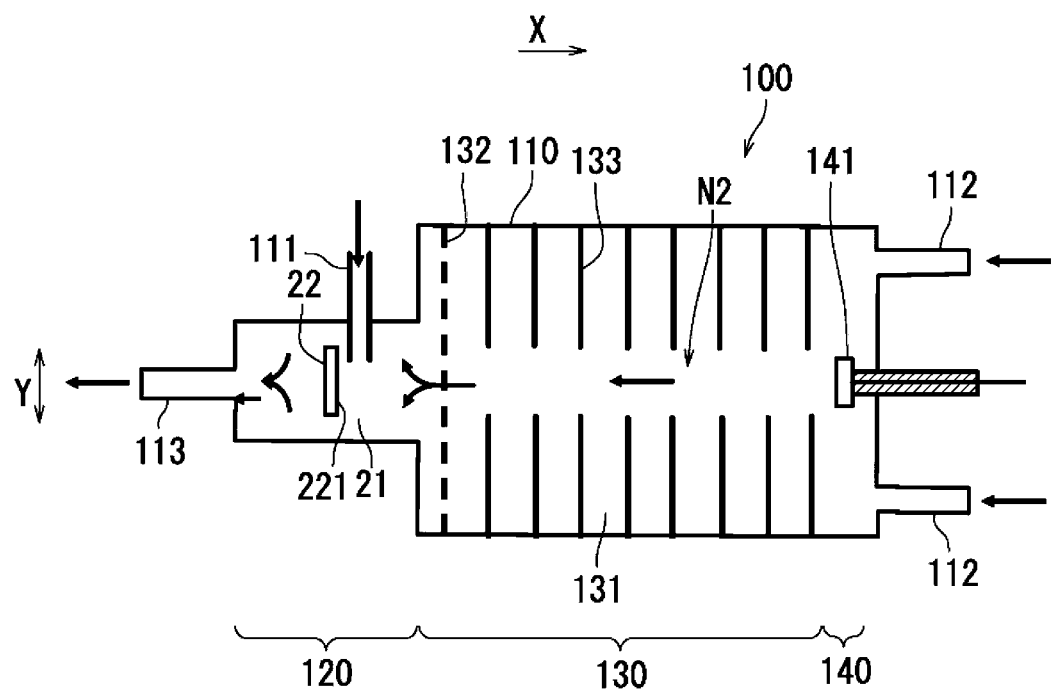
FIG. 10 is a schematic diagram illustrating a fifth embodiment of the analysis apparatus.

Subsequently, the fifth embodiment of the analysis apparatus 100 will be described with reference to FIG. 10. FIG. 10 is a schematic diagram illustrating the fifth embodiment of the analysis apparatus 100.

The analysis apparatus 100 of the fifth embodiment is different from the analysis apparatus 100 of the fourth embodiment in a fact that the counter electrode 23 is not included. Hereinafter, a point which is different from the fourth embodiment will be mostly described.

The analysis apparatus 100 of the fifth embodiment is the drift tube-type ion mobility spectrometry apparatus.

As illustrated in FIG. 10, the analysis apparatus 100 does not include the counter electrode 23. The electron emission element 22 faces the gate 132. Specifically, the surface electrode 221 of the electron emission element 22 (refer to FIG. 5) faces the gate 132. The surface electrode 221 is disposed upstream of the gate 132 in the movement direction X.

The reaction chamber 21 is located between the electron emission element 22 and the gate 132. Specifically, the reaction chamber 21 is located between the surface electrode 221 and the gate 132.

The reaction chamber 21 is connected to the sample introduction section 154 (not illustrated in the drawing) through the sample inlet section 111. The sample introduction section 154 introduces the sample to the reaction chamber 21 through the sample inlet section 111. As a result, the sample is introduced to the reaction chamber 21.

The electron emission element 22 emits the electron toward the gate 132. Specifically, the surface electrode 221 emits the electron toward the gate 132. As a result, the sample-derived ions are generated in the reaction chamber 21. That is, the gate 132 functions as the counter electrode 23. Meanwhile, the ions which are generated in the reaction chamber 21 are moved to the ion detector 141 based on the same principle as in the fourth embodiment.

The exhaust port 113 is formed the uppermost stream of the guide section 110 in the movement direction X. The carrier gas, which is introduced to the inside of the guide section 110 from the sample inlet section 111, and the drift gas, which is introduced to the inside of the guide section 110 from the drift gas inlet section 112, are moved upstream of the movement direction X, and are discharged from the exhaust port 113. In addition, the neutral substance, which is generated in the inside of the guide section 110, is also moved upstream of the movement direction X and is discharged from the exhaust port 113.

Hereinabove, as being described with reference to FIG. 10, the gate 132 functions as the counter electrode 23. Accordingly, the counter electrode 23 is not desired, and thus it is possible to simplify the analysis apparatus 100.

Sixth Embodiment

Figure 12:
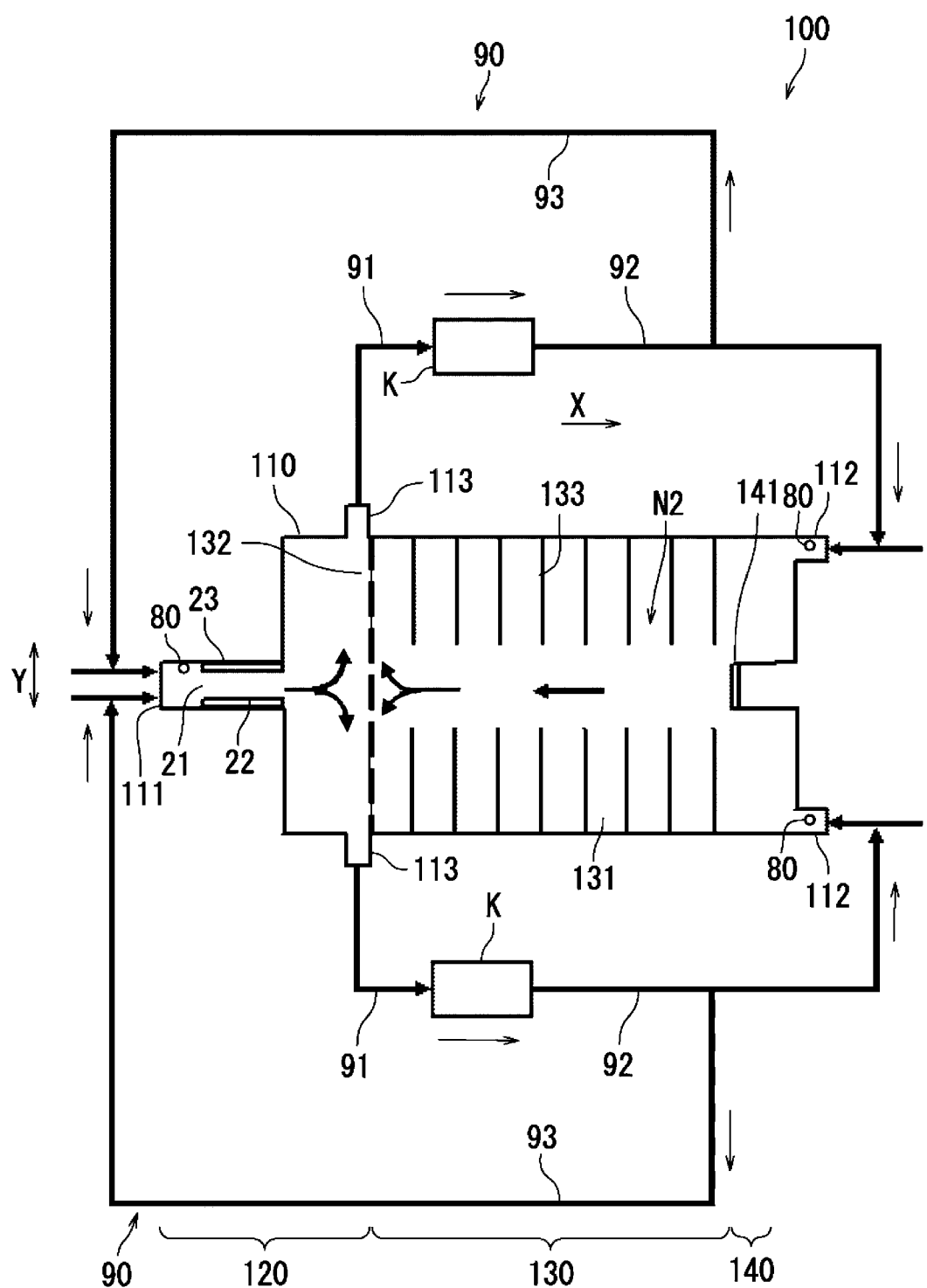
FIG. 12 is a schematic diagram illustrating a sixth embodiment of the analysis apparatus.

Subsequently, the sixth embodiment of the analysis apparatus 100 will be described with reference to FIGS. 12 to 14. FIG. 12 is a schematic diagram illustrating the sixth embodiment of the analysis apparatus 100.

The analysis apparatus 100 of the sixth embodiment is different from that of the fourth embodiment in a fact that the electron emission element 22 is controlled based on the humidity of the inside N2 of the guide section 110. Hereinafter, a point which is different from the fourth embodiment will be mostly described.

The analysis apparatus 100 further includes a humidity sensor 80. The humidity sensor 80 detects the humidity of the inside N2 of the guide section 110.

The humidity sensor 80 is disposed in the vicinity of the reaction chamber 21 in the inside N2 of the guide section 110.

The humidity sensor 80 is disposed in the vicinity of the reaction chamber 21 in the inside N2 of the guide section 110. As a result, it is possible for the humidity sensor 80 to effectively detect humidity in the vicinity of the reaction chamber 21.

Meanwhile, a location where the humidity sensor 80 is disposed in the inside N2 of the guide section 110 is not particularly limited. The humidity sensor 80 may be disposed, for example, in the vicinity of the drift gas inlet section 112. In addition, it is preferable that the humidity sensor 80 is not disposed in a location, such as the reaction chamber 21, in which the ions are generated, or an ion movement path such as the drift section 131. As a result, it is possible to inhibit the humidity sensor 80 from interrupting the generation of the ions and movement of the icons.

The analysis apparatus 100 further includes a drying agent K and a passage section 90.

The drying agent K captures moisture of a gas. The gas indicates at least one of the carrier gas, the drift gas, and the sample. The drying agent K includes, for example, a molecular sieve. The drying agent K is installed in the passage section 90.

The passage section 90 is a tube-shaped member. The passage section 90 causes the gas to be circulated by returning the gas, which is discharged from the guide section 110, to the inside N2 of the guide section 110.

The passage section 90 leads to the sample inlet section 111, the drift gas inlet section 112, and the exhaust port 113.

The sample inlet section 111 and the drift gas inlet section 112 are examples of the introduction section of the disclosure. The exhaust port 113 is an example of a discharge section of the disclosure.

The passage section 90 includes a first passage section 91, a second passage section 92, and a third passage section 93. The first passage section 91 leads to the exhaust port 113 and the drying agent K. The second passage section 92 leads to the drying agent K and the drift gas inlet section 112. The third passage section 93 branches off from the second passage section 92 and leads to the sample inlet section 111.

After the gas which is discharged from the exhaust port 113 is calculated through the first passage section 91, the gas passes through the drying agent K. The gas, which passes through the drying agent K, is circulated through the second passage section 92. A part of the gas which is circulated through the second passage section 92 returns from the drift gas inlet section 112 to the inside N2 of the guide section 110. Another part of the gas, which is circulated through the second passage section 92, returns from the sample inlet section 111 to the inside N2 of the guide section 110 after flowing in the third passage section 93.

In a case where the gas, which is discharged from the exhaust port 113, passes through the drying agent K, moisture is supplemented by the drying agent K. Furthermore, after the moisture is supplemented by the drying agent K, the gas returns to the inside N2 of the guide section 110 through the second passage section 92 or the third passage section 93. Accordingly, it is possible to maintain the humidity of the inside N2 of the guide section 110 as humidity in a prescribed range. For example, the humidity in the prescribed range is equal to or higher than 0.5% and is equal to or less than 10%. Meanwhile, it is preferable that the humidity in the prescribed range is equal to or less than 1%. In addition, it is preferable that the humidity in the prescribed range is humidity which produces a dew point of 0° or less at a certain temperature.

Meanwhile, in order to more effectively maintain the humidity of the inside N2 of the guide section 110 in the prescribed range, it is preferable that the guide section 110 is sealed. A fact that the guide section 110 is sealed specifically indicates a fact that a part, excluding a spot where communication with the outside is indispensable, of the guide section 110 is sealed on a structure of the guide section 110, such as a wiring hole, which is gravitated toward the sample inlet section 111, the drift gas inlet section 112, the exhaust port 113, and the inside N2 of the guide section 110.

Figures 13A, 13B:
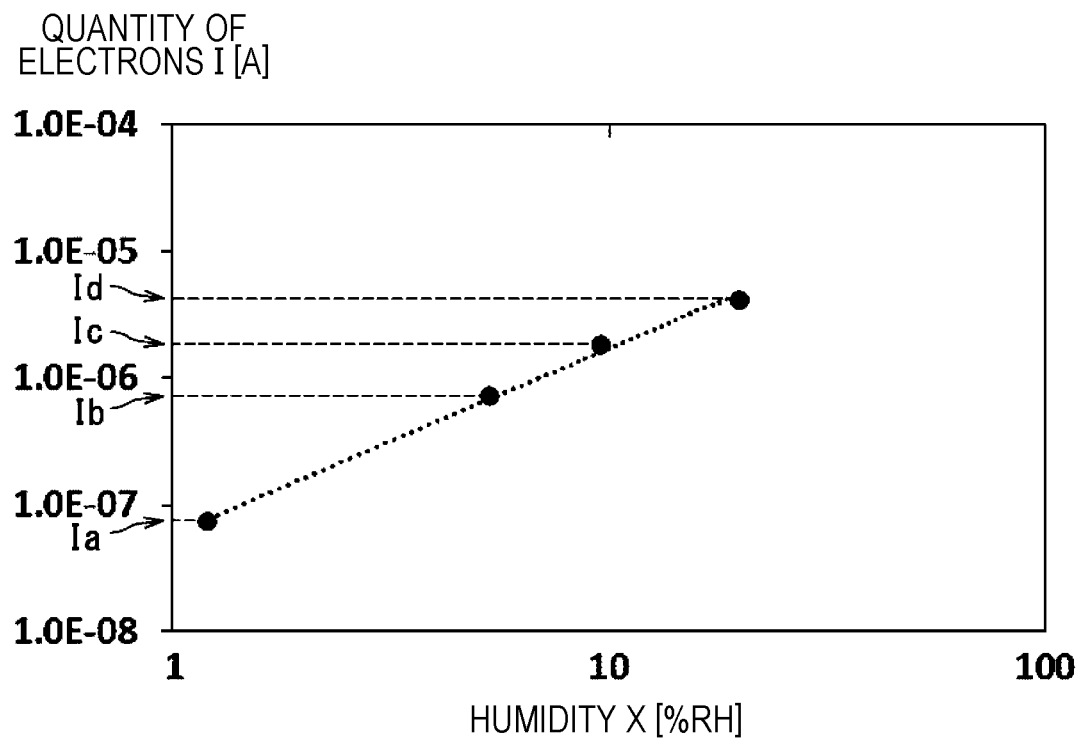
FIG. 13A is a graph illustrating a relationship between humidity of an inside of a casing and the quantity of electrons emitted from the electron emission element.
FIG. 13B is a table illustrating a relationship between the humidity of the inside of the casing and the quantity of electrons emitted from the electron emission element.

Subsequently, a relationship between the humidity of the inside N2 of the guide section 110 and the quantity of electrons which are emitted from the electron emission element 22 will be described with reference to FIGS. 13A and 13B. FIG. 13A is a graph illustrating a relationship between humidity Z of the inside N2 of the guide section 110 and the quantity I of electrons which are emitted from the electron emission element 22. FIG. 13B is a table illustrating a relationship between the humidity Z of the inside N2 of the guide section 110 and the quantity I of electrons which are emitted from the electron emission element 22. Meanwhile, specifically, the quantity I of electrons indicates the quantity of electrons per unit time.

The inventor of the present application performed an experiment of measuring the quantity I of electrons which are emitted from the electron emission element 22 whenever the humidity Z of the inside N2 of the guide section 110 is changed.

A procedure of the experiment performed by the inventor of the present application will be described. First, the inventor of the present application causes the electron emission element 22 to be driven for approximately 1200 hours while maintaining the humidity Z of the inside N2 of the guide section 110 by approximately 1%. Furthermore, the inventor of the present application causes the electron emission element 22 to be driven for approximately 1 hour while maintaining the humidity Z of the inside N2 of the guide section 110 by approximately 1.2%. Furthermore, the inventor of the present application calculates an average of the total amount of the electrons emitted from the electron emission element 22 at this time as the quantity Ia of electrons in a case where the humidity Z of the inside N2 of the guide section 110 is 1.2%. The inventor of the present application calculates the quantity Ib of electrons in a case where the humidity Z of the inside N2 of the guide section 110 is 5.3%, the quantity Ic of electrons in a case where the humidity Z of the inside N2 of the guide section 110 is 9.6%, and the quantity Id of electrons in a case where the humidity Z of the inside N2 of the guide section 110 is 19.9% using the same procedure performed in a case where the quantity Ia of electrons is calculated. Meanwhile, in a case where the experiment is performed, the inventor of the present application maintains a voltage Vd which is applied to the electron emission element 22 as a fixed voltage of 18 V.

The graph of FIG. 13A and the table of FIG. 13B show a result of the experiment performed by the inventor of the present application. As illustrated in FIGS. 13A and 13B, the quantity Ia of electrons, which is acquired in the case where the humidity Z of the inside N2 of the guide section 110 is 1.2%, is a current of 7.23E-08 A. The quantity Ib of electrons, which is acquired in the case where the humidity Z of the inside N2 of the guide section 110 is 5.3%, is a current of 7.19E-07 A. The quantity Ic of electrons, which is acquired in the case where the humidity Z of the inside N2 of the guide section 110 is 9.6%, is a current of 1.80E-06 A. The quantity Id of electrons, which is acquired in the case where the humidity Z of the inside N2 of the guide section 110 is 19.9%, is a current of 4.12E-06 A.

In a case where the experiment is performed, the inventor of the present application found that there is a correlation between the humidity Z of the inside N2 of the guide section 110 and the quantity I of electrons which are emitted from the electron emission element 22 for each time unit. Specifically, in a case where the voltage which is applied to the electron emission element 22 is fixed, the quantity I of electrons which are emitted from the electron emission element 22 becomes larger as the humidity Z of the inside N2 of the guide section 110 becomes higher.

However, in a case where the quantity I of electrons which are emitted from the electron emission element 22 is changed according to the change in the humidity Z of the inside N2 of the guide section 110, the quantity of ions which are generated in the ionization section 120 is changed. Furthermore, in a case where the quantity of ions which are generated in the ionization section 120 is changed, an ion detection result acquired by the ion detection section 140 is changed. That is, a problem occurs in that the ion detection result acquired by the ion detection section 140 is changed by being affected by the humidity Z of the inside N2 of the guide section 110.

Subsequently, an operation, which is performed to improve the above problem, of the controller 161 (refer to FIG. 8) will be described with reference to FIGS. 12 and 14. FIG. 14 is a flowchart illustrating the operation of the controller 161.

Figure 14:
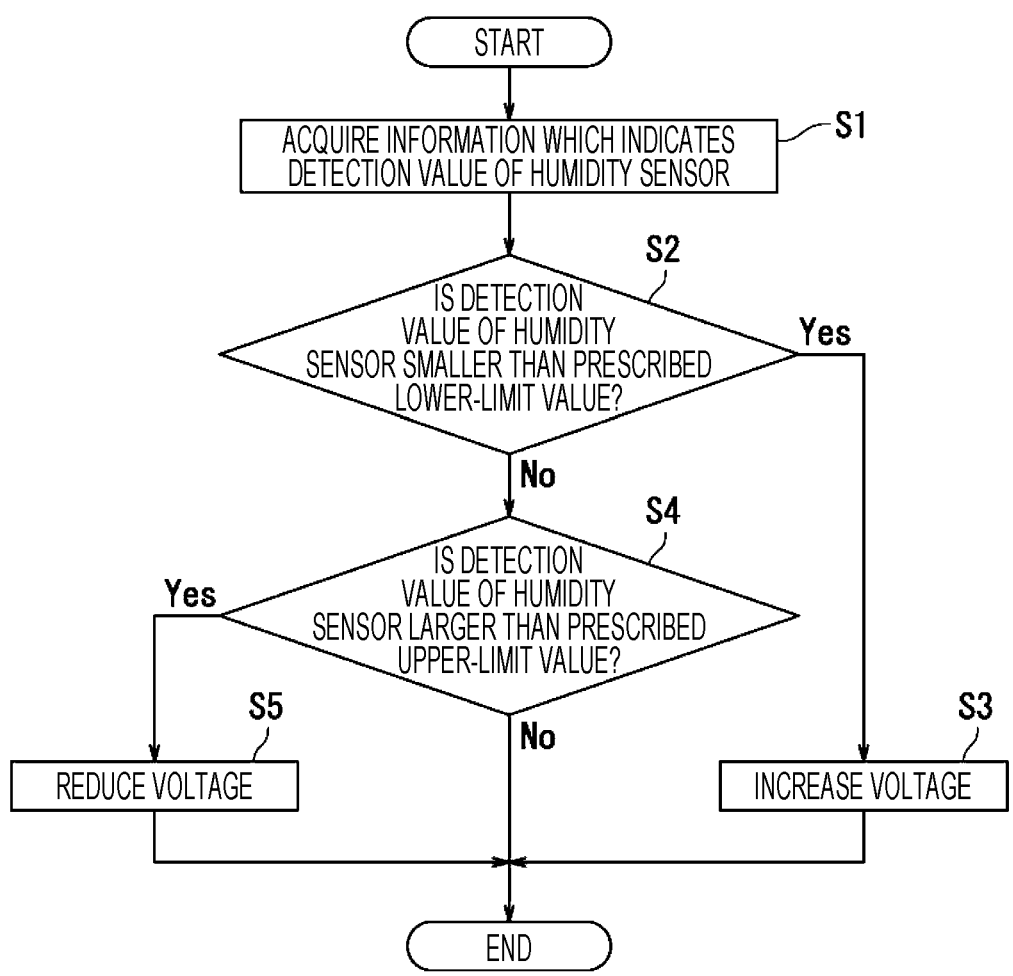
FIG. 14 is a flowchart illustrating an operation of a controller.

As illustrated in FIGS. 12 and 14, in step S1, the controller 161 acquires information, which indicates a detection value of the humidity sensor 80, from the humidity sensor 80. Meanwhile, in step S1, a fixed voltage α is applied to the electron emission element 22 by the power supply section 53 (refer to FIG. 8).

In step S2, the controller 161 determines whether or not the detection value of the humidity sensor 80 is less than a prescribed lower limit value (prescribed lower limit threshold). The prescribed lower limit value is, for example, 2%.

In a case where the controller 161 determines that the detection value of the humidity sensor 80 is less than the prescribed lower limit value (Yes in step S2), the process proceeds to step S3. In a case where the controller 161 determines that the detection value of the humidity sensor 80 is not less than the prescribed lower limit value (No in step S2), the process proceeds to step S4.

In step S3, the controller 161 controls the power supply section 53 such that the voltage, which is applied to the electron emission element 22, is increased rather than the voltage α. Accordingly, it is possible to supplement the quantity of electrons, which are emitted from the electron emission element 22, the quantity being decreased due to a decrease in the humidity of the inside N2 of the guide section 110, by increasing the voltage which is applied to the electron emission element 22. As a result, even in a case where the humidity of the inside N2 of the guide section 110 is decreased, it is possible to inhibit the quantity of electrons, which are emitted from the electron emission element 22, from being changed.

In a case where the process shown in step S3 ends, the process ends.

In step S4, the controller 161 determines whether or not the detection value of the humidity sensor 80 is larger than the prescribed upper limit value (prescribed upper limit threshold). The prescribed upper limit value is a value which is equal to or larger than the prescribed lower limit value. The prescribed upper limit value is, for example, 3%.

In a case where the controller 161 determines that the detection value of the humidity sensor 80 is larger than the prescribed upper limit value (Yes in step S4), the process proceeds to step S5. In a case where the controller 161 determines that the detection value of the humidity sensor 80 is not larger than the prescribed upper limit value (No in step S4), the process ends.

In step S5, the controller 161 controls the power supply section 53 such that the voltage which is applied to the electron emission element 22 is decreased rather than the voltage α. Accordingly, it is possible to offset the quantity of electrons, which are emitted from the electron emission element 22, the quantity being increased due to an increase in the humidity of the inside N2 of the guide section 110, by decreasing the voltage which is applied to the electron emission element 22. As a result, even in a case where the humidity of the inside N2 of the guide section 110 is increased, it is possible to inhibit the quantity of electrons, which are emitted from the electron emission element 22, from being changed.

Hereinabove, as being described with reference to FIGS. 12 and 14, in a case where the humidity of the inside N2 of the guide section 110 is less than the prescribed lower limit value, the controller 161 controls the voltage such that the voltage, which is applied to the electron emission element 22, is increased. In addition, in a case where the humidity of the inside N2 of the guide section 110 is larger than the prescribed upper limit value, the controller 161 controls the voltage such that the voltage, which is applied to the electron emission element 22, is decreased. Accordingly, even in a case where the humidity of the inside N2 of the guide section 110 is changed, it is possible to inhibit the quantity of electrons, which are emitted from the electron emission element 22, from being changed. As a result, it is possible to inhibit the ion detection result, which is acquired by the ion detection section 140, from being changed by being affected by the change in the humidity Z of the inside N2 of the guide section 110. Meanwhile, the control of the voltage indicates the control of the power supply section 53.

Hereinabove, the embodiments of the disclosure are described with reference to the drawings (FIGS. 1 to 14). However, the disclosure is not limited to the embodiments, and can be realized in various aspects without departing from the gist (for example, (1) to (5)). In addition, in a case where a plurality of components disclosed in the embodiments are appropriately combined, it is possible to form various technologies. For example, some components may be removed from all the components illustrated in the embodiments. The drawings are schematically illustrated while targeting the respective components for easy understanding, and there is a case where the number of respective components illustrated in the drawings or the like is different from an actual state from a circumstance of preparation of the drawings. In addition, the respective components illustrated in the embodiments are examples and are not particularly limited. Various modifications are possible without substantially departing from advantages of the disclosure.

(1) In the first to third embodiments, the ionization section 20 may be detachable from the ion separation section 30 (refer to FIGS. 2, 6, and 7). In a case where the ionization section 20 is detachable from the ion separation section 30, it is possible for a user to individually exchange the ion separation section 30 with the ionization section 20. As a result, it is possible for the user to effectively maintain the analysis apparatus 100.

Hereinafter, an example of an apparatus configuration, which provided such that the ionization section 120 is detachable from the ion separation section 130, of the analysis apparatus 100 will be described.

In the example of the apparatus configuration of the analysis apparatus 100, the guide section 10 is split into a first guide member and a second guide member at a part, which is located between the reaction chamber 21 and the field asymmetric ion movement section 31, of the guide section 10.

The first guide member includes an engaging member in a fingernail shape. The second guide member includes an engaged section in a recess shape. It is possible for the engaged member of the second guide member to be engaged with the engaging member of the first guide member. Furthermore, in a case where the engaging section is engaged with the engaged section, the first guide member is connected to the second guide member. As a result, the ionization section 120 is mounted with respect to the ion separation section 130. In contrast, in a case where the engaging section is released from the engaged section and engagement between the first guide member and the second guide member is cancelled, the ionization section 120 is released from the ion separation section 130.

Accordingly, in a case where the engaging member is used, it is possible to construct the ionization section 120 to be detachable from the ion separation section 130.

Meanwhile, instead of the engaging member and the engaged member, a connection member, such as a screw, may be used in order to detachably connect the second guide member to the first guide member.

In addition, in a state in which the first guide member and the second guide member are connected to each other, a seal member, such as a packing, may be mounted on a connection spot between the first guide member and the second guide member. As a result, it is possible to secure sealability of a connection section between the first guide member and the second guide member.

(2) In the fourth to sixth embodiments, the ionization section 120 may be detachable from the ion separation section 130 (refer to FIGS. 9, 10, and 12). A configuration in which the ionization section 120 is detachable from the ion separation section 130 is the same as, for example, the configuration in which the ionization section 20 is detachable from the ion separation section 30.

(3) In the first to fifth embodiments, the intermediate layer 223 includes the silicone resin and the conductive microparticle which is dispersed in the silicone resin, as illustrated in FIG. 5. However, the disclosure is not limited thereto.

Figure 11:
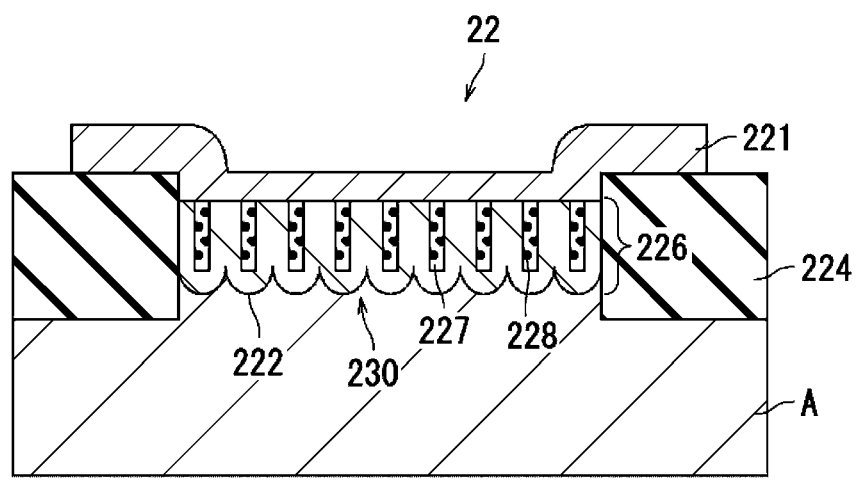
FIG. 11 is a diagram illustrating a modification example of an intermediate layer.

An intermediate layer 230, which is a modification example of the intermediate layer 223, will be described with reference to FIG. 11. FIG. 11 is a diagram illustrating the intermediate layer 230.

As illustrated in FIG. 11, the intermediate layer 230 includes a porous alumina layer 226. The porous alumina layer 226 includes a plurality of fine pores 227. In the fine pore 227, conductive microparticles 228 are carried.

The lower part electrode 222 is formed of, for example, an aluminum substrate which has a thickness of 0.5 mm. The porous alumina layer 226 is an anodic oxidation layer which is formed on a surface of the substrate A. Meanwhile, the porous alumina layer 226 may be the anodic oxidation layer which is formed on a surface of an aluminum layer that is supported by the substrate A. In a case where the substrate A is an insulation substrate, such as a glass substrate, a conductive layer may be formed between the aluminum layer and the substrate A, and the aluminum layer and the conductive layer may be used as the lower part electrode 222. For example, it is preferable that a thickness of the aluminum layer which functions as the lower part electrode 222 is equal to or larger than 10 μm.

The fine pores 227 are opened on an upper surface of the porous alumina layer 226. The fine pores 227 are dug down toward a boundary between the porous alumina layer 226 and the lower part electrode 222. The fine pores 227 are provided in plural and are dispersedly disposed in the electron emission range. The fine pores 227 have a depth to the extent of being not reach the lower part electrode 222.

For example, a diameter of the fine pore 227 is equal to or larger than 50 nm and is equal to or less than 3 μm. Meanwhile, the diameter of the fine pore 227 may be differ in a depth direction and may become smaller on a bottom side. It is preferable that a thickness of the porous alumina layer 226 is equal to or larger than 10 nm and is equal to or less than 5 μm.

In a case where it is possible to be carried by aluminum, it is possible to use any type of conductor as the conductive microparticle 228. A particle diameter of the conductive microparticle 228 is smaller than, for example, the diameter of the fine pore 227. For example, the particle diameter of the conductive microparticle 228 is equal to or larger than 1 nm and is equal to or less than 80 nm. It is preferable that the particle diameter of the conductive microparticle 228 is equal to or larger than 3 nm and is equal to or less than 10 nm.

For example, in a case where a silver nanoparticle is used as the conductive microparticle 228, it is preferable that the particle diameter of the conductive microparticle 228 is equal to or larger than 1 nm and is equal to or smaller than 50 nm. In addition, in this case, it is more preferable that the particle diameter of the conductive microparticle 228 is equal to or larger than 3 nm and is equal to or less than 10 nm. The silver nanoparticle may be covered by an organic compound. The organic compound is, for example, an alcohol derivative and/or a surfactant.

(4) The configuration of the analysis apparatus 100, which is illustrated in FIG. 12, of the sixth embodiment may be applied to the analysis apparatus 100, which is illustrated in FIG. 10, of the fifth embodiment. In this case, the analysis apparatus 100 of the fifth embodiment further includes the humidity sensor 80, the drying agent K, and the passage section 90. Furthermore, the controller 161 of the analysis apparatus 100 of the fifth embodiment controls the voltage, which is applied to the electron emission element 22, based on the detection value of the humidity sensor 80, thereby performing the processes shown in steps S1 to S5 of FIG. 14. As a result, an advantage which is the same as that of the analysis apparatus 100 of the sixth embodiment is acquired.

(5) The configuration of the analysis apparatus 100, which is illustrated in FIG. 12, of the sixth embodiment may be applied to the analysis apparatus 100, which is illustrated in FIG. 1, of the first embodiment, the analysis apparatus 100, which is illustrated in FIG. 6, of the second embodiment, and the analysis apparatus 100, which is illustrated in FIG. 7, of the third embodiment, respectively.

Hereinafter, the configurations of the analysis apparatuses 100 of the first to third embodiments, which are acquired in a case where the configuration of the analysis apparatus 100 of the sixth embodiment is applied to the analysis apparatuses 100 of the first to third embodiments, will be described.

The analysis apparatuses 100 of the first to third embodiments further include the humidity sensor 80, the drying agent K, and the passage section 90. The humidity sensor 80 is disposed in the inside N1 of the guide section 10. The passage section 90 leads to the sample inlet section 11, the first carrier gas inlet section 12, the second carrier gas inlet section 13, and the exhaust port section 14. The passage section 90 returns the gas, which is discharged from the exhaust port section 14, to the inside N1 of the guide section 10 through the sample inlet section 11, the first carrier gas inlet section 12, and the second carrier gas inlet section 13. The sample inlet section 11, the first carrier gas inlet section 12, and the second carrier gas inlet section 13 are second examples of the introduction section of the disclosure. The exhaust port section 14 is a second example of the discharge section of the disclosure.

The drying agent K is disposed in the passage section 90. As a result, it is possible to maintain the humidity of the inside N1 of the guide section 10 by the humidity in the prescribed range.

It is preferable that the guide section 10 is also sealed as the same as the guide section 110 (refer to FIGS. 8 and 10).

Each of the controller 61 of the analysis apparatus 100 of the first embodiment to the controller 61 of the analysis apparatus 100 of the third embodiment performs steps S1 to S5 illustrated in FIG. 14 by controlling the power supply section 53 based on the detection value of the humidity sensor 80 in such a way as to control the voltage which is applied to the electron emission element 22. As a result, the same advantage as in the analysis apparatus 100 of the sixth embodiment is acquired for each of the analysis apparatuses 100 of the first to third embodiments.

It is possible to use the disclosure for an electron emission element field.

The present disclosure contains subject matter related to that disclosed in Japanese Priority Patent Application JP 2018-067547 filed in the Japan Patent Office on Mar. 30, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An analysis apparatus comprising:
an ionization section that generates one or more sample component-derived ions;
an ion separation section that separates the ions in accordance with mobility of the ions; and
an ion detection section that detects the ion which passes through the ion separation section,
wherein the ionization section includes
a reaction chamber to which a sample is introduced, and
an electron emission element that emits an electron to the reaction chamber,
wherein the electron emission element includes
a surface electrode that faces the reaction chamber, and
a lower part electrode that faces the surface electrode, and
emits the electron to the reaction chamber from the surface electrode by applying a voltage between the surface electrode and the lower part electrode.

2. The analysis apparatus according to claim 1, further comprising:
a power supply section that applies to the electron emission element a voltage at which energy of the electron, which is emitted by the electron emission element, is higher than 0 eV and is equal to or lower than 10 eV.

3. The analysis apparatus according to claim 1, further comprising:
a carrier gas introduction section that introduces a carrier gas with prescribed humidity to the reaction chamber.

4. The analysis apparatus according to claim 3, further comprising:
a sample introduction section configured to introduce the sample
to the reaction chamber after the carrier gas introduction section introduces the carrier gas with the prescribed humidity to the reaction chamber.

5. The analysis apparatus according to claim 1,
wherein the electron emission element further includes an intermediate layer that is located between the surface electrode and the lower part electrode, and
wherein the intermediate layer has prescribed volume resistivity.

6. The analysis apparatus according to claim 5,
wherein the intermediate layer includes a silicone resin and conductive microparticles, which are dispersed in the silicone resin, or includes a porous alumina layer.

7. The analysis apparatus according to claim 1,
wherein the ion separation section is a field asymmetric ion separation section.

8. The analysis apparatus according to claim 1,
wherein the ion separation section includes an ion movement section in which the ion moves, and
wherein a passage area of the reaction chamber is larger than a passage area of the ion movement section.

9. The analysis apparatus according to claim 1,
wherein the ionization section is attachable to and detachable from the ion separation section.

10. The analysis apparatus according to claim 1,
wherein the ion separation section includes an ion movement section in which the ion moves, and
a gate that is located between the ion movement section and the reaction chamber,
wherein the gate faces the electron emission element, and
wherein the reaction chamber is located between the gate and the electron emission element.

11. The analysis apparatus according to claim 1, further comprising:
a counter electrode that is separated from the electron emission element along a direction intersecting with a movement direction of the ion,
wherein the electron emission element emits the electron toward the counter electrode by a voltage applied between the counter electrode and the electron emission element.

12. An analysis apparatus comprising:
an ionization section that generates one or more sample component-derived ions;
an ion separation section that separates the ions in accordance with mobility of the ions; and
an ion detection section that detects the ion which passes through the ion separation section,
wherein the ionization section includes
a reaction chamber to which a sample is introduced, and
an electron emission element that emits an electron to the reaction chamber, and
wherein the analysis apparatus further comprises:
a casing in which the reaction chamber is disposed;
a humidity sensor that detects humidity of an inside of the casing; and
a controller that controls the electron emission element based on a detection value of the humidity sensor.

13. The analysis apparatus according to claim 12, further comprising:
a power supply section that applies to the electron emission element a voltage,
wherein the controller controls the power supply section to increase the voltage in a case where the detection value of the humidity sensor is smaller than a prescribed lower limit threshold, and
wherein the controller controls the power supply section to decrease the voltage in a case where the detection value of the humidity sensor is larger than a prescribed upper limit threshold.

14. The analysis apparatus according to claim 12,
wherein the humidity sensor is disposed in a vicinity of the reaction chamber.

15. The analysis apparatus according to claim 12, further comprising:
an introduction section that introduces a gas to the inside of the casing;
a discharge section that discharges the gas inside the casing;
a passage section that leads to the introduction section and the discharge section; and
a drying agent that is installed in the passage section.

* * * * *